United States Patent
White et al.

(10) Patent No.: US 9,864,986 B1
(45) Date of Patent: Jan. 9, 2018

(54) ASSOCIATING A MONETARY VALUE CARD WITH A PAYMENT OBJECT

(71) Applicant: Square, Inc., San Francisco, CA (US)

(72) Inventors: Michael Wells White, San Francisco, CA (US); Jianliang Zhao, Palo Alto, CA (US); Christopher Lang Mocko, San Francisco, CA (US); Zhimin Ren, San Bruno, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/526,361

(22) Filed: Oct. 28, 2014

Related U.S. Application Data

(63) Continuation-in-part of application No. 14/225,338, filed on Mar. 25, 2014.

(51) Int. Cl.
| | |
|---|---|
| *G06Q 20/00* | (2012.01) |
| *G06Q 20/34* | (2012.01) |
| *G06Q 20/20* | (2012.01) |
| *G06Q 20/24* | (2012.01) |
| *G06Q 40/00* | (2012.01) |

(52) U.S. Cl.
CPC ......... *G06Q 20/342* (2013.01); *G06Q 20/202* (2013.01); *G06Q 20/24* (2013.01)

(58) Field of Classification Search
USPC .......................................................... 705/17
See application file for complete search history.

(56) References Cited

U.S. PATENT DOCUMENTS

| | | | |
|---|---|---|---|
| 5,276,311 | A | 1/1994 | Hennige |
| 5,530,232 | A | 6/1996 | Taylor |
| 5,585,787 | A | 12/1996 | Wallerstein |
| 5,590,038 | A | 12/1996 | Pitroda |
| 5,960,411 | A | 9/1999 | Hartman et al. |

(Continued)

FOREIGN PATENT DOCUMENTS

| | | |
|---|---|---|
| KR | 10-2006-0103089 A | 9/2006 |
| WO | 2015/061005 A1 | 4/2015 |

(Continued)

OTHER PUBLICATIONS

U.S. Appl. No. 13/830,350 of Morgan, T.B., et al., filed Mar. 14, 2013.

(Continued)

*Primary Examiner* — Garcia Ade
(74) *Attorney, Agent, or Firm* — Lee & Hayes, PLLC

(57) ABSTRACT

Methods and apparatuses related to linking a monetary value card with a payment card. In some embodiments, a payer uses a gift card to pay for a purchase. The gift card is swiped by a point of sale (POS) system, and a computer system processes a payment. The computer system causes the POS system to display a message prompting the payer to provide an email address for an electronic receipt. The payer provides the email address, which the computer system uses to determine that the payer has a payment card. The computer system sends a message to the payer asking if he would like to link the gift card with the payment card, to which the payer responds affirmatively. The payer later uses the payment card to initiate a payment, and the computer system processes the payment based on the gift card that is linked with the payment card.

20 Claims, 15 Drawing Sheets

(56) References Cited

U.S. PATENT DOCUMENTS

| | | |
|---|---|---|
| 6,175,922 B1 | 1/2001 | Wang |
| 6,193,155 B1 * | 2/2001 | Walker .................. G06Q 20/04 235/381 |
| 6,263,352 B1 | 7/2001 | Cohen |
| 6,341,353 B1 | 1/2002 | Herman et al. |
| 6,764,005 B2 | 7/2004 | Cooper |
| 7,085,812 B1 | 8/2006 | Sherwood |
| 7,155,411 B1 | 12/2006 | Blinn et al. |
| 7,233,843 B2 | 6/2007 | Budhraja et al. |
| 7,478,054 B1 | 1/2009 | Adams et al. |
| 7,493,390 B2 | 2/2009 | Bobde et al. |
| 7,552,087 B2 | 6/2009 | Schultz et al. |
| 7,575,166 B2 | 8/2009 | McNamara |
| 7,580,873 B1 | 8/2009 | Silver et al. |
| 7,603,382 B2 | 10/2009 | Halt, Jr. |
| 7,805,378 B2 | 9/2010 | Berardi et al. |
| 7,818,809 B1 | 10/2010 | Sobel et al. |
| 8,060,259 B2 | 11/2011 | Budhraja et al. |
| 8,190,514 B2 | 5/2012 | Bishop et al. |
| 8,266,551 B2 | 9/2012 | Boldyrev et al. |
| 8,401,710 B2 | 3/2013 | Budhraja et al. |
| 8,423,459 B1 | 4/2013 | Green et al. |
| 8,459,544 B2 | 6/2013 | Casey et al. |
| 8,498,888 B1 | 7/2013 | Raff et al. |
| 8,577,803 B2 | 11/2013 | Chatterjee et al. |
| 8,579,203 B1 | 11/2013 | Lambeth et al. |
| 8,602,296 B1 | 12/2013 | Velline et al. |
| 8,630,586 B2 | 1/2014 | Dvortsov et al. |
| 8,676,119 B2 | 3/2014 | Cohen et al. |
| 8,788,418 B2 | 7/2014 | Spodak et al. |
| 8,855,312 B1 | 10/2014 | Hodgman et al. |
| 8,859,337 B2 | 10/2014 | Gaul et al. |
| 8,892,462 B1 | 11/2014 | Borovsky et al. |
| 8,939,357 B1 | 1/2015 | Perry |
| 8,972,298 B2 | 3/2015 | Kunz et al. |
| 9,010,644 B1 | 4/2015 | Workley |
| 9,064,249 B1 | 6/2015 | Borovsky et al. |
| 9,092,767 B1 | 7/2015 | Andrews et al. |
| 9,092,776 B2 | 7/2015 | Dessert |
| 9,092,828 B2 | 7/2015 | Hosp |
| 2003/0061157 A1 | 3/2003 | Hirka et al. |
| 2003/0065805 A1 | 4/2003 | Barnes, Jr. |
| 2003/0115126 A1 | 6/2003 | Pitroda |
| 2004/0030601 A1 | 2/2004 | Pond et al. |
| 2004/0138999 A1 | 7/2004 | Friedman et al. |
| 2004/0204990 A1 | 10/2004 | Lee et al. |
| 2004/0215520 A1 | 10/2004 | Butler et al. |
| 2004/0219971 A1 | 11/2004 | Ciancio et al. |
| 2006/0085333 A1 | 4/2006 | Wah et al. |
| 2006/0131385 A1 | 6/2006 | Kim |
| 2006/0146839 A1 | 7/2006 | Hurwitz et al. |
| 2006/0261149 A1 | 11/2006 | Raghavendra Tulluri |
| 2007/0069013 A1 | 3/2007 | Seifert et al. |
| 2007/0073619 A1 | 3/2007 | Smith |
| 2007/0208930 A1 | 9/2007 | Blank et al. |
| 2007/0255653 A1 | 11/2007 | Tumminaro et al. |
| 2007/0255662 A1 | 11/2007 | Tumminaro |
| 2008/0037442 A1 | 2/2008 | Bill |
| 2008/0040265 A1 | 2/2008 | Rackley, III et al. |
| 2008/0052176 A1 | 2/2008 | Buchheit |
| 2008/0078831 A1 | 4/2008 | Johnson et al. |
| 2008/0133351 A1 | 6/2008 | White et al. |
| 2008/0177826 A1 | 7/2008 | Pitroda |
| 2008/0262925 A1 | 10/2008 | Kim et al. |
| 2008/0270246 A1 | 10/2008 | Chen |
| 2008/0277465 A1 | 11/2008 | Pletz et al. |
| 2008/0296978 A1 | 12/2008 | Finkenzeller et al. |
| 2009/0070228 A1 | 3/2009 | Ronen |
| 2009/0099961 A1 | 4/2009 | Ogilvy |
| 2009/0106138 A1 | 4/2009 | Smith et al. |
| 2009/0112766 A1 | 4/2009 | Hammad et al. |
| 2009/0119190 A1 | 5/2009 | Realini |
| 2009/0159663 A1 | 6/2009 | Mullen et al. |
| 2009/0192904 A1 | 7/2009 | Patterson et al. |
| 2009/0266884 A1 | 10/2009 | Killian et al. |
| 2009/0271265 A1 | 10/2009 | Lay et al. |
| 2009/0288012 A1 | 11/2009 | Hertel et al. |
| 2009/0313132 A1 | 12/2009 | McKenna et al. |
| 2009/0319421 A1 | 12/2009 | Mathis et al. |
| 2009/0319638 A1 | 12/2009 | Faith et al. |
| 2010/0010906 A1 | 1/2010 | Grecia |
| 2010/0076777 A1 | 3/2010 | Paretti et al. |
| 2010/0082420 A1 | 4/2010 | Trifiletti et al. |
| 2010/0102125 A1 | 4/2010 | Gatto |
| 2010/0174596 A1 | 7/2010 | Gilman et al. |
| 2010/0223145 A1 | 9/2010 | Dragt |
| 2010/0306099 A1 | 12/2010 | Hirson et al. |
| 2011/0029416 A1 | 2/2011 | Greenspan |
| 2011/0047013 A1 | 2/2011 | McKenzie, III |
| 2011/0055084 A1 | 3/2011 | Singh |
| 2011/0071892 A1 | 3/2011 | Dickelman |
| 2011/0087550 A1 | 4/2011 | Fordyce, III et al. |
| 2011/0131128 A1 | 6/2011 | Vaananen |
| 2011/0145049 A1 | 6/2011 | Hertel et al. |
| 2011/0145052 A1 | 6/2011 | Lin et al. |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251892 A1 | 10/2011 | Laracey |
| 2011/0251962 A1 * | 10/2011 | Hruska .............. G06Q 20/0457 705/72 |
| 2011/0258689 A1 | 10/2011 | Cohen et al. |
| 2011/0270747 A1 | 11/2011 | Xu |
| 2011/0276418 A1 | 11/2011 | Velani |
| 2011/0295750 A1 | 12/2011 | Rammal |
| 2011/0302019 A1 | 12/2011 | Proctor, Jr. et al. |
| 2011/0302080 A1 | 12/2011 | White et al. |
| 2011/0313840 A1 | 12/2011 | Mason et al. |
| 2011/0313867 A9 | 12/2011 | Silver |
| 2011/0313871 A1 | 12/2011 | Greenwood |
| 2011/0320345 A1 | 12/2011 | Taveau et al. |
| 2012/0011072 A1 | 1/2012 | Lodolo |
| 2012/0016731 A1 | 1/2012 | Smith et al. |
| 2012/0029990 A1 | 2/2012 | Fisher |
| 2012/0030044 A1 | 2/2012 | Hurst |
| 2012/0059701 A1 | 3/2012 | van der Veen et al. |
| 2012/0059718 A1 | 3/2012 | Ramer et al. |
| 2012/0059758 A1 | 3/2012 | Carlson |
| 2012/0084210 A1 * | 4/2012 | Farahmand ........ G06Q 20/3226 705/64 |
| 2012/0110568 A1 | 5/2012 | Abel et al. |
| 2012/0143772 A1 | 6/2012 | Abadir |
| 2012/0150611 A1 | 6/2012 | Isaacson et al. |
| 2012/0150643 A1 | 6/2012 | Wolfe et al. |
| 2012/0150742 A1 | 6/2012 | Poon et al. |
| 2012/0166311 A1 | 6/2012 | Dwight et al. |
| 2012/0185355 A1 | 7/2012 | Kilroy |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0209749 A1 | 8/2012 | Hammad et al. |
| 2012/0209773 A1 | 8/2012 | Ranganathan |
| 2012/0214416 A1 | 8/2012 | Kent et al. |
| 2012/0244885 A1 | 9/2012 | Hefetz |
| 2012/0254031 A1 | 10/2012 | Walker et al. |
| 2012/0271707 A1 | 10/2012 | Harrison et al. |
| 2012/0271725 A1 | 10/2012 | Cheng |
| 2012/0278727 A1 | 11/2012 | Ananthakrishnan et al. |
| 2012/0290422 A1 | 11/2012 | Bhinder |
| 2012/0290609 A1 | 11/2012 | Britt |
| 2012/0296679 A1 | 11/2012 | Im |
| 2012/0296726 A1 | 11/2012 | Dessert et al. |
| 2012/0323685 A1 | 12/2012 | Ullah |
| 2013/0006773 A1 | 1/2013 | Lutnick et al. |
| 2013/0019284 A1 | 1/2013 | Pacyga et al. |
| 2013/0024341 A1 | 1/2013 | Jeon et al. |
| 2013/0024364 A1 | 1/2013 | Shrivastava et al. |
| 2013/0024371 A1 | 1/2013 | Hariramani et al. |
| 2013/0030889 A1 | 1/2013 | Davich et al. |
| 2013/0041824 A1 | 2/2013 | Gupta |
| 2013/0048719 A1 | 2/2013 | Bennett |
| 2013/0050080 A1 | 2/2013 | Dahl et al. |
| 2013/0054320 A1 | 2/2013 | Dorso et al. |

(56) References Cited

U.S. PATENT DOCUMENTS

| | | |
|---|---|---|
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132274 A1 | 5/2013 | Henderson et al. |
| 2013/0134962 A1 | 5/2013 | Kamel et al. |
| 2013/0138563 A1 | 5/2013 | Gilder et al. |
| 2013/0144707 A1 | 6/2013 | Isaacson et al. |
| 2013/0151613 A1 | 6/2013 | Dhawan et al. |
| 2013/0159081 A1 | 6/2013 | Shastry et al. |
| 2013/0159172 A1 | 6/2013 | Kim |
| 2013/0159173 A1 | 6/2013 | Sivaraman et al. |
| 2013/0159446 A1 | 6/2013 | Carlson et al. |
| 2013/0166402 A1 | 6/2013 | Parento et al. |
| 2013/0166445 A1 | 6/2013 | Isaacson et al. |
| 2013/0173407 A1 | 7/2013 | Killian et al. |
| 2013/0179227 A1 | 7/2013 | Booth et al. |
| 2013/0181045 A1 | 7/2013 | Dessert et al. |
| 2013/0198018 A1 | 8/2013 | Baig |
| 2013/0204727 A1 | 8/2013 | Rothschild |
| 2013/0204777 A1 | 8/2013 | Irwin, Jr. et al. |
| 2013/0204793 A1 | 8/2013 | Kerridge et al. |
| 2013/0218697 A1 | 8/2013 | Kingston et al. |
| 2013/0218721 A1 | 8/2013 | Borhan et al. |
| 2013/0225081 A1 | 8/2013 | Doss et al. |
| 2013/0228616 A1 | 9/2013 | Bhosle et al. |
| 2013/0236109 A1 | 9/2013 | Madden et al. |
| 2013/0246203 A1 | 9/2013 | Laracey |
| 2013/0246280 A1 | 9/2013 | Kirsch |
| 2013/0248591 A1 | 9/2013 | Look et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0317835 A1 | 11/2013 | Mathew |
| 2013/0317950 A1 | 11/2013 | Abraham et al. |
| 2013/0332354 A1 | 12/2013 | Rhee et al. |
| 2013/0332385 A1 | 12/2013 | Kilroy et al. |
| 2013/0339253 A1 | 12/2013 | Sincai |
| 2013/0346223 A1 | 12/2013 | Prabhu et al. |
| 2014/0006205 A1 | 1/2014 | Berry et al. |
| 2014/0012754 A1 | 1/2014 | Hanson et al. |
| 2014/0032297 A1 | 1/2014 | Germann et al. |
| 2014/0052617 A1 | 2/2014 | Chawla et al. |
| 2014/0057667 A1 | 2/2014 | Blankenship et al. |
| 2014/0058861 A1 | 2/2014 | Argue et al. |
| 2014/0067557 A1 | 3/2014 | van Niekerk et al. |
| 2014/0074569 A1 | 3/2014 | Francis et al. |
| 2014/0074655 A1 | 3/2014 | Lim et al. |
| 2014/0074658 A1 | 3/2014 | Sanchez |
| 2014/0074691 A1 | 3/2014 | Bank et al. |
| 2014/0074716 A1 | 3/2014 | Ni |
| 2014/0081783 A1 | 3/2014 | Paranjape et al. |
| 2014/0081853 A1 | 3/2014 | Sanchez et al. |
| 2014/0081854 A1 | 3/2014 | Sanchez et al. |
| 2014/0084059 A1 | 3/2014 | Sierchio et al. |
| 2014/0089073 A1 | 3/2014 | Jacobs et al. |
| 2014/0089078 A1 | 3/2014 | Dessert et al. |
| 2014/0096179 A1 | 4/2014 | Ben-Shalom et al. |
| 2014/0099888 A1 | 4/2014 | Flanagan et al. |
| 2014/0100931 A1 | 4/2014 | Sanchez et al. |
| 2014/0100973 A1 | 4/2014 | Brown et al. |
| 2014/0101737 A1 | 4/2014 | Rhee |
| 2014/0108245 A1 | 4/2014 | Drummond et al. |
| 2014/0114775 A1 | 4/2014 | Cloin et al. |
| 2014/0114781 A1 | 4/2014 | Watanabe |
| 2014/0122345 A1 | 5/2014 | Argue et al. |
| 2014/0129357 A1 | 5/2014 | Goodwin |
| 2014/0129942 A1 | 5/2014 | Rathod |
| 2014/0136318 A1 | 5/2014 | Alberth, Jr. et al. |
| 2014/0136349 A1 | 5/2014 | Dave et al. |
| 2014/0149282 A1 | 5/2014 | Philliou et al. |
| 2014/0156508 A1 | 6/2014 | Argue et al. |
| 2014/0156517 A1 | 6/2014 | Argue et al. |
| 2014/0164234 A1 | 6/2014 | Coffman et al. |
| 2014/0180805 A1 | 6/2014 | Argue et al. |
| 2014/0184505 A1 | 7/2014 | Fullerton et al. |
| 2014/0201067 A1 | 7/2014 | Lai et al. |
| 2014/0207669 A1 | 7/2014 | Rosenberg |
| 2014/0214567 A1 | 7/2014 | Llach et al. |
| 2014/0214652 A1 | 7/2014 | Zheng et al. |
| 2014/0249947 A1 | 9/2014 | Hicks et al. |
| 2014/0250002 A1 | 9/2014 | Isaacson et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279098 A1 | 9/2014 | Ham |
| 2015/0012426 A1 | 1/2015 | Purves et al. |
| 2015/0025983 A1 | 1/2015 | Cicerchi |
| 2015/0032567 A1 | 1/2015 | Bhatia |
| 2015/0058146 A1 | 2/2015 | Gaddam et al. |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0120418 A1 | 4/2015 | Cervenka et al. |
| 2015/0134513 A1 | 5/2015 | Olson et al. |
| 2015/0134528 A1 | 5/2015 | Fineman et al. |
| 2015/0178755 A1 | 6/2015 | Barroso |
| 2015/0194023 A1 | 7/2015 | Brackenridge et al. |
| 2016/0086166 A1 | 3/2016 | Pomeroy et al. |

FOREIGN PATENT DOCUMENTS

| | | |
|---|---|---|
| WO | 2015/069389 A1 | 5/2015 |
| WO | 2015/100378 A1 | 7/2015 |
| WO | 2015/179316 A1 | 11/2015 |

OTHER PUBLICATIONS

U.S. Appl. No. 13/837,562 of Chin, H.C.A., et al., filed Mar. 15, 2013.
U.S. Appl. No. 14/088,113 of Maxwell, D.W., et al., filed Nov. 22, 2013.
U.S. Appl. No. 14/145,895 of Aaron, P., et al., filed Dec. 31, 2013.
U.S. Appl. No. 14/149,754 of Spindel, N., et al., filed Jan. 7, 2014.
U.S. Appl. No. 14/160,490 of Moring, D., et al., filed Jan. 21, 2014.
U.S. Appl. No. 14/165,256 of Aaron, P., filed Jan. 27, 2014.
U.S. Appl. No. 14/168,274 of Odawa, A., et al., filed Jan. 30, 2014.
U.S. Appl. No. 14/182,655 of Spindel, N., et al., filed Feb. 18, 2014.
U.S. Appl. No. 14/184,503 of Borovsky, A., et al., filed Feb. 19, 2014.
U.S. Appl. No. 14/189,869 of Lamba, K., et al., filed Feb. 25, 2014.
U.S. Appl. No. 14/189,880 of Aaron, P., et al., filed Feb. 25, 2014.
U.S. Appl. No. 14/208,800 of Thome, J.P., et al., filed Mar. 13, 2014.
U.S. Appl. No. 14/513,076 of Borovsky, A., et al., filed Oct. 13, 2014.
U.S. Appl. No. 14/088,141 of Maxwell, D.W., et al., filed Nov. 22, 2013.
Non-Final Office Action dated Apr. 4, 2014, U.S. Appl. No. 14/172,842 of Borovsky, A., et al., filed Feb. 4, 2014.
Non-Final Office Action dated Apr. 10, 2014, U.S. Appl. No. 14/160,490 of Moring, D., et al., filed Jan. 21, 2014.
Restriction Requirement dated Apr. 28, 2014, U.S. Appl. No. 14/165,256 of Aaron, P., filed Jan. 27, 2014.
Non-Final Office Action dated May 29, 2014, U.S. Appl. No. 13/837,562 of Chin, H.C.A., et al., filed Mar. 15, 2013.
Notice of Allowance dated Aug. 1, 2014, U.S. Appl. No. 14/172,842 of Borovsky, A., et al., filed Feb. 4, 2014.
Non-Final Office Action dated Aug. 27, 2014, U.S. Appl. No. 14/165,256 of Aaron, P., filed Jan. 27, 2014.
Final Office Action dated Aug. 28, 2014, U.S. Appl. No. 14/160,490 of Moring, D., et al., filed Jan. 21, 2014.
Advisory Action dated Nov. 18, 2014, U.S. Appl. No. 14/160,490 of Moring, D., et al., filed Jan. 21, 2014.
International search report and written opinion for PCT Application No. PCT/US2014/058398 dated Dec. 24, 2014.

(56) References Cited

OTHER PUBLICATIONS

Non-Final Office Action dated Jan. 9, 2015, U.S. Appl. No. 14/145,895 of Aaron, P., et al., filed Dec. 31, 2013.
International search report and written opinion for PCT Application No. PCT/US2014/058447 dated Jan. 15, 2015.
Final Office Action dated Jan. 26, 2015, U.S. Appl. No. 13/837,562 of Chin, H.C.A., et al., filed Mar. 15, 2013.
Notice of Allowance dated Feb. 20, 2015, U.S. Appl. No. 14/513,076 of Borovsky, A., et al., filed Oct. 13, 2014.
Final Office Action dated Mar. 17, 2015, U.S. Appl. No. 14/165,256 of Aaron, P., filed Jan. 27, 2014.
International search report and written opinion for PCT Application No. PCT/US2014/072269 dated Mar. 31, 2015.
Restriction Requirement dated Apr. 9, 2015, U.S. Appl. No. 14/225,338 of Aaron, P., et al., filed Mar. 25, 2014.
U.S. Appl. No. 14/692,655 of Borovsky, A., et al., filed Apr. 21, 2015.
Non-Final Office Action dated Apr. 27, 2015, U.S. Appl. No. 14/184,503 of Borovsky, A., et al., filed Feb. 19, 2014.
Non-Final Office Action dated May 12, 2015, U.S. Appl. No. 14/189,869 of Lamba, K., et al., filed Feb. 25, 2014.
Non-Final Office Action dated Jul. 2, 2015, for U.S. Appl. No. 14/208,800, of Thome, J.P., et al., filed Mar. 13, 2014.
Restriction Requirement dated Jul. 24, 2015, for U.S. Appl. No. 14/182,655, of Spindel, N., et al., filed Feb. 18, 2014.
Final Office Action dated Aug. 18, 2015, for U.S. Appl. No. 14/145,895, of Aaron, P., et al., filed Dec. 31, 2013.
International Search Report and Written Opinion for PCT Application No. PCT/US2015/031423 dated Aug. 13, 2015.
"Another EBay Band-Aid Fails to Fix the New Pricing Structure Flaws," dated Oct. 18, 2008, Retrieved from the Internet URL: https://thebrewsnews.wordpress.com/2008/10/18/another-ebay-band-aid-fails-to-fix-the-new-pricing-structure-flaws/, pp. 1-5.
"Online Shopping," dated Nov. 2, 2014, Retrieved from the Internet URL: http://en.wikipedia.org/wiki/Online_shopping, on Nov. 10, 2014, pp. 1-12.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "What is Multi-Factor Authentication, and How Will it Change in the Future?, " Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
U.S. Appl. No. 13/829,080, of Morgan, T.B., et al., filed Mar. 14, 2013.
U.S. Appl. No. 13/829,658, of Morgan, T.B., et al., filed Mar. 14, 2013.
U.S. Appl. No. 14/197,704, of Lamba, K., et al., filed Mar. 5, 2014.
U.S. Appl. No. 14/329,638, of Aaron, P., et al., filed Jul. 11, 2014.
U.S. Appl. No. 14/329,658, of Aaron, P., et al., filed Jul. 11, 2014.
U.S. Appl. No. 14/730,860, of Sasmaz, Y., et al., filed Jun. 4, 2015.
Non-Final Office Action dated Mar. 19, 2015, for U.S. Appl. No. 14/329,638, of Aaron, P., et al., filed Jul. 11, 2014.
Non-Final Office Action dated May 20, 2015, for U.S. Appl. No. 13/829,080, of Morgan, T.B., et al., filed Mar. 14, 2013.
Non-Final Office Action dated May 26, 2015, for U.S. Appl. No. 14/225,338, of Aaron, P., et al., filed Mar. 25, 2014.
Non-Final Office Action dated May 27, 2015, for U.S. Appl. No. 14/197,704, of Lamba, K., et al., filed Mar. 5, 2014.
Non-Final Office Action dated Jun. 11, 2015, for U.S. Appl. No. 14/692,655, of Borovsky, A., et al., filed Apr. 21, 2015.
Restriction Requirement dated Jun. 19, 2015, for U.S. Appl. No. 14/329,658, of Aaron, P., et al., filed Jul. 11, 2014.

"Tracking Inventory," PayPal, dated Jan. 4, 2010, Retrieved from the Internet URL: https://www.paypal-community.com/t5/How-to-use-PayPal-Archive/Tracking-inventory/td-p/19392, pp. 1-3.
Final Office Action dated Sep. 17, 2015, for U.S. Appl. No. 13/829,080, of Morgan, T.B., et al., filed Mar. 14, 2013.
Notice of Allowance dated Sep. 18, 2015, for U.S. Appl. No. 14/197,704, of Lamba, K., et al., filed Mar. 5, 2014.
Final Office Action dated Sep. 21, 2015, for U.S. Appl. No. 14/184,503, of Borovsky, A., et al., filed Feb. 19, 2014.
Non-Final Office Action dated Sep. 30, 2015, for U.S. Appl. No. 14/189,880, of Aaron, P., filed Feb. 25, 2014.
Final Office Action dated Oct. 2, 2015, for U.S. Appl. No. 14/225,338, of Aaron, P., et al., filed Mar. 25, 2014.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Non-Final Office Action dated Oct. 8, 2015, for U.S. Appl. No. 14/149,754, of Spindel, N., et al., filed Jan. 7, 2014.
Final Office Action dated Oct. 16, 2015, for U.S. Appl. No. 14/692,655, of Borovsky, A., et al., filed Apr. 21, 2015.
Final Rejection dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 4, 2015, for U.S. Appl. No. 14/184,503, of Borovsky, A., et al., filed Feb. 19, 2014.
"Merchantindustry.com—Best Merchant Services," retrieved from Internet URL: https://web.archive.org/web/20121020212419/http://www.merchantindustry.com/, on Dec. 30, 2015, pp. 1-7.
Advisory Action dated Dec. 30, 2015, for U.S. Appl. No. 14/692,655, of Borovsky, A., et al., filed Apr. 21, 2015.
Final Office Action dated Dec. 31, 2015, for U.S. Appl. No. 14/208,800, of Thome, J. P., et al., filed Mar. 13, 2014.
Advisory Action dated Dec. 31, 2015, for U.S. Appl. No. 14/225,338, of Aaron, P., et al., filed Mar. 25, 2014.
Non-Final Office Action dated Jan. 22, 2016, for U.S. Appl. No. 14/189,869, of Lamba, K., et al., filed Feb. 25, 2014.
Non-Final Office Action dated Feb. 2, 2016, for U.S. Appl. No. 13/829,080, of Morgan, T, B., et al., filed Mar. 14, 2013.
Restriction Requirement dated Feb. 29, 2016, for U.S. Appl. No. 14/088,141, of Maxwell, D. W., et al., filed Nov. 22, 2013.
Non-Final Office Action dated Mar. 14, 2016, for U.S. Appl. No. 14/692,655, of Borovsky, A., et al., filed Apr. 21, 2015.
Restriction Requirement dated Mar. 16, 2016, for U.S. Appl. No. 14/088,113, of Maxwell, D. W., et al., filed Nov. 22, 2013.
Non-Final Office Action dated Mar. 24, 2016, for U.S. Appl. No. 14/145,895, of Aaron, P., et al., filed Dec. 31, 2013.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/225,338, of Aaron, P., et al., filed Mar. 25, 2014.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Advisory Action dated Sep. 21, 2016, for U.S. Appl. No. 14/149,754, of Spindel, N., et al., filed Jan. 7, 2014.
Non-Final Office Action dated Sep. 21, 2016, for U.S. Appl. No. 14/189,880, of Aaron, P., filed Feb. 25, 2014.
Non-Final Office Action dated Sep. 22, 2016, for U.S. Appl. No. 14/182,655, of Spindel, N., et al., filed Feb. 18, 2014.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Final Office Action dated Apr. 28, 2016, for U.S. Appl. No. 14/189,880, of Aaron, P., et al., filed Feb. 25, 2014.

(56) References Cited

OTHER PUBLICATIONS

Non-Final Office Action dated May 3, 2016, for U.S. Appl. No. 13/830,350, of Morgan, T. B., et al., filed Mar. 14, 2013.
Non-Final Office Action dated May 9, 2016, for U.S. Appl. No. 14/225,338, of Aaron, P., et al., filed Mar. 25, 2013.
Non-Final Office Action dated Jan. 20, 2017, for U.S. Appl. No. 14/168,274, of Odawa, A.W., et al., filed Jan. 30, 2014.
Corrected Notice of Allowance dated Feb. 27, 2017, for U.S. Appl. No. 14/329,658, of Aaron, P., et al., filed Jul. 11, 2014.
Notice of Allowance dated Mar. 2, 2017, for U.S. Appl. No. 13/829,080, of Morgan, T.B., et al., filed Mar. 14, 2013.
Final Office Action dated Mar. 2, 2017, for U.S. Appl. No. 14/189,880, of Aaron, P., et al., filed Feb. 25, 2014.
Advisory Action dated Mar. 9, 2017, for U.S. Appl. No. 14/184,503, of Borovsky, A., et al., filed Feb. 19, 2014.
Non-Final Office Action dated Mar. 13, 2017, for U.S. Appl. No. 14/189,869, of Lamba, K., et al., filed Feb. 25, 2014.
Non-Final Office Action dated Mar. 15, 2017, for U.S. Appl. No. 13/829,658, of Morgan, T.B., et al., filed Mar. 14, 2013.
Examiner Requisition for Canadian Patent Application No. 2,930,186, mailed Jan. 30, 2017.
Notice of Acceptance for Australian Patent Application No. 2014347192, mailed Feb. 16, 2017.
Final Office Action dated Nov. 10, 2016, for U.S. Appl. No. 13/830,350, of Morgan, T.B., et al., filed Mar. 14, 2013.
Final Office Action dated Nov. 29, 2016, for U.S. Appl. No. 14/088,113, of Maxwell, D.W., et al., filed Nov. 22, 2013.
Final Office Action dated Nov. 30, 2016, for U.S. Appl. No. 14/208,800, of Thome, J.P., et al., filed Mar. 13, 2014.
Final Office Action dated Dec. 12, 2016, for U.S. Appl. No. 14/088,141, of Maxwell, D.W., et al., filed Nov. 22, 2013.
Advisory Action dated Dec. 22, 2016, for U.S. Appl. No. 14/145,895, of Aaron, P., et al., filed Dec. 31, 2013.
Final Office Action dated Dec. 27, 2016, for U.S. Appl. No. 14/184,503, of Borovsky, A., et al., filed Feb. 19, 2014.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examination Report No. 1 for Australian Patent Application No. 2014347192, dated Dec. 15, 2016.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Advisory Action dated Oct. 11, 2016, for U.S. Appl. No. 14/189,869, of Lamba, K, et al., filed Feb. 25, 2014.
Final Office Action dated Oct. 12, 2016, for U.S. Appl. No. 14/145,895, of Aaron, P., et al., filed Dec. 31, 2013.
Final Office Action dated Nov. 1, 2016, for U.S. Appl. No. 14/160,490, of Moring, D., et al., filed Jan. 21, 2014.
Notice of Allowance dated Nov. 8, 2016, for U.S. Appl. No. 14/225,338, of Aaron, P., et al., filed Mar. 25, 2014.
Shalmanese, "The Straight Dope Message Board," message dated Oct. 5, 2013, Retrieved from the internet URL: http://boards.straightdope.com/sdmb/showthread.php?t=703989%BB, on Jul. 18, 2016, pp. 1-10.
Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 7, 2016, for U.S. Appl. No. 14/208,800, of Thome, J.P., et al., filed Mar. 13, 2014.
Non-Final Office Action dated Jun. 8, 2016, for U.S. Appl. No. 14/088,141, of Maxwell, D.W., et al., filed Nov. 22, 2013.
Non-Final Office Action dated Jun. 17, 2016, for U.S. Appl. No. 14/184,503, of Borovsky, A., et al., filed Feb. 19, 2014.
Final Office Action dated Jun. 17, 2016, for U.S. Appl. No. 14/149,754, of Spindel, N., et al., filed Jan. 7, 2014.
Final Office Action dated Jun. 20, 2016, for U.S. Appl. No. 13/829,658, of Morgan, T.B., et al., filed Mar. 14, 2013.
Non-Final Office Action dated Jul. 14, 2016, for U.S. Appl. No. 14/160,490, of Moring, D., et al., filed Jan. 21, 2014.
Final Office Action dated Jul. 18, 2016, for U.S. Appl. No. 14/189,869, of Lamba, K., el al., filed Feb. 25, 2014.

\* cited by examiner

ASSOCIATING A MONETARY VALUE CARD WITH A PAYMENT OBJECT

PRIORITY CLAIM

This application is a continuation-in-part of U.S. patent application Ser. No. 14/225,338, entitled "ASSOCIATING AN ACCOUNT WITH A CARD BASED ON A PHOTO", which was filed on Mar. 25, 2014, which is incorporated by reference herein in its entirety.

BACKGROUND

Consumers today use many types of payment cards (e.g., credit cards, debit cards, prepaid gift cards) and other payment objects (e.g., a smartphone with a digital wallet or a card with a quick response (QR) code) to make purchases. Consumers may carry multiple payment cards or other payment objects for a variety of reasons, however, some consumers find carrying such an array of payment options inconvenient and burdensome. For example, all these multiple payment cards may add to an overstuffed wallet or purse, making it difficult for the consumer to find a particular payment card. As another example, the consumer may misplace or forget a payment card, such as a gift card, and may not have the card when needed to pay for a purchase.

BRIEF DESCRIPTION OF THE DRAWINGS

Embodiments of the present invention will be described and explained through the use of the accompanying drawings in which.

DETAILED DESCRIPTION

Figure 1:
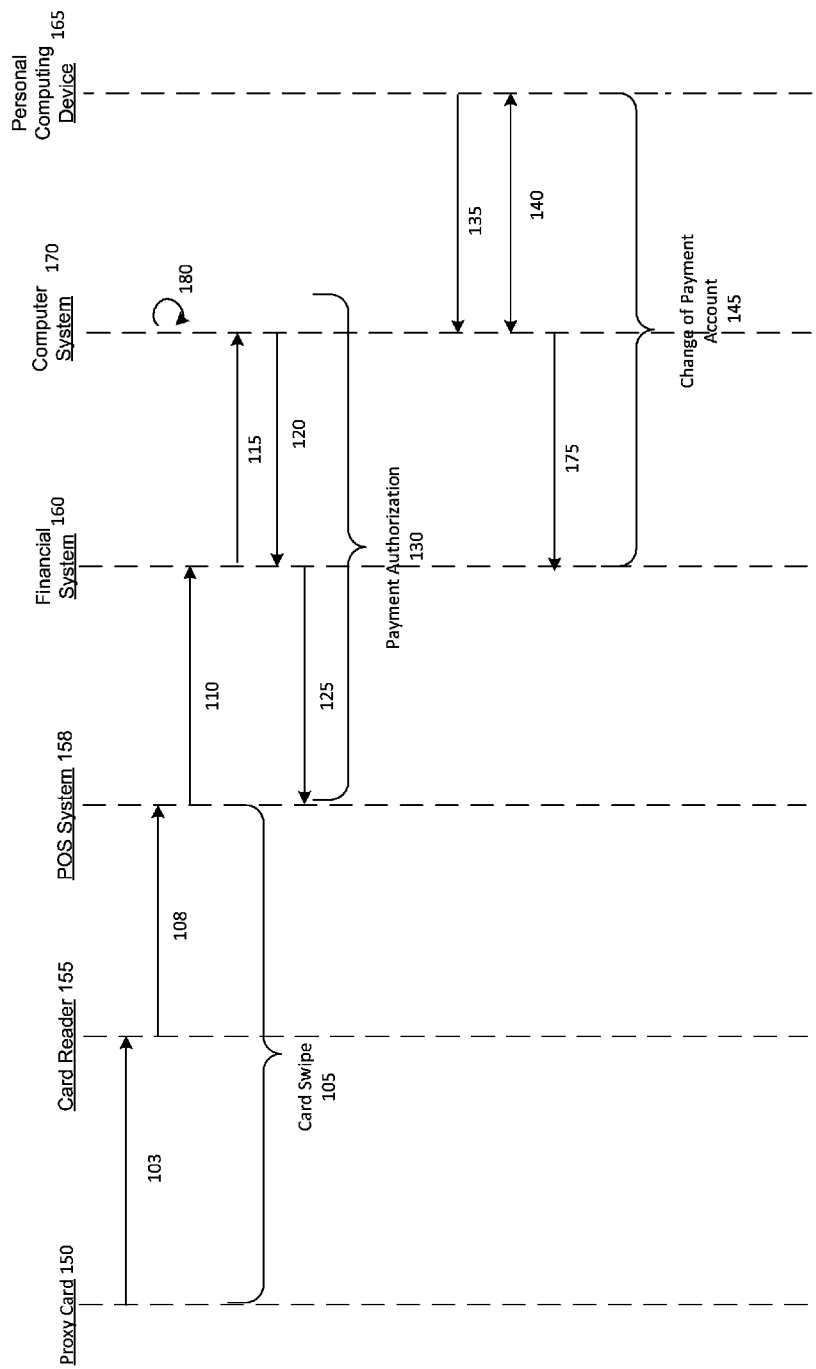
FIG. 1 is an illustration of a process for paying for a purchase using a proxy card.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

This application discloses a technique and related technology for associating monetary value cards with a payment object, for example a credit or debit card, to enable a consumer to use the payment object for a financial transaction that is paid for with funds of the monetary value card. A monetary value card is a payment card that is not issued in the name of any person or entity, but rather can be used by any person to make a payment. Further, a monetary value card has no associated credit account or credit funds, but rather has an associated zero or positive monetary value that is stored at a financial account associated with the monetary value card, or that is stored on the card itself. Examples of monetary value cards include gift cards and stored-value cards. A person, such as a purchaser of a monetary value card, can add funds to the monetary value of the monetary value card by, for example, providing funds to a merchant that sells the monetary value card. The merchant can add the funds, less any associated fees, to the monetary value of the monetary value card.

The disclosed technology enables a consumer to make a payment in a financial transaction, by using funds of a monetary value card without having to carry the monetary value card, thereby providing greater convenience to the consumer and avoiding adding to the consumer's possibly overstuffed wallet.

Consider the following illustrative use case. A consumer receives a gift card as a gift. He uses the gift card at a merchant to purchase a cup of coffee, where the merchant swipes the gift card using a card reader associated with a point-of-sale (POS) system. The POS system initiates processing of the purchase payment by sending transaction information, such as the cost of the purchase, and gift card information, such as information obtained from the gift card by the card reader, to a payment service system, which can be a computer system that is part of a financial system or that is separate from the financial system. For this illustrative case, the payment service system is separate from the financial system, The payment service system processes a payment for the purchase, such as by sending a message to the financial system to cause funds for the purchase to be obtained based on the monetary value of the gift card. The financial system causes funds for the purchase to be debited from a financial account associated with the gift card, and credited to a financial account associated with the merchant.

The term "cause" and variations thereof, as used in the preceding paragraph and elsewhere in this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Further, any references to sending or transmitting a message, signal, etc. to another device (recipient device), as used above and elsewhere in this description, means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

Additionally, the term "swipe" herein refers to any manner of triggering a card reader to read a card, such as passing a card through a magnetic stripe reader, smartcard reader, optical code reader, radio frequency identification (RFID) reader, etc. The term "card reader" herein refers to any object that can be used to obtain information from an object used to make an electronic payment where the card reader must be in the general vicinity of the object, such as an optical scanner, a near field communications device, a Bluetooth communications device, etc.

Continuing with the illustrative use case, the payment service system sends a message to the POS system that prompts the POS system to display a message asking the consumer whether he would like an electronic receipt for his purchase. The consumer indicates that he would like an electronic receipt, and enters personal information, such as his phone number or email address, to indicate where the electronic receipt should be sent. The payment service system, based on the personal information, determines that the consumer has a credit card, such as by performing a database search based on the email address or phone number to determine if either is associated with a consumer and/or a credit card. The payment service system sends a message to the POS system that prompts the POS system to display a message asking if the consumer would like to link (associate) the gift card with his credit card. The consumer indicates an affirmative response, and the payment service system links the gift card to the consumer's credit card via a database association.

At a later time, the consumer visits another merchant to purchase some goods. The consumer brings the goods to a checkout stand and presents the same credit card to the merchant to pay for the purchase. The merchant swipes the credit card using a card reader associated with a second POS system. The second POS system initiates processing of the purchase payment by sending transaction information, such as the cost of the purchase, and credit card information, such as information obtained from the credit card by the card reader, to the payment service system. The payment service system, based on the credit card information, determines that the gift card is associated with the credit card.

The payment service system sends a message to the second POS system to prompt the second POS system to display a message notifying the consumer that he has a gift card linked to his credit card, and asks the consumer if he would like to use the gift card for the purchase. The consumer indicates an affirmative response, and the payment service system processes a payment for the purchase based on the gift card. For example, the computer system sends a message to a financial system to cause funds for the purchase to be obtained based on the monetary value of the gift card. The financial system causes funds for the purchase to be debited from a financial account associated with the gift card, and credited to a financial account associated with the merchant.

In the following description, the example of a merchant selling goods to a customer is used, for illustrative purposes only, to explain various aspects of the technique introduced here. Note, however, that the technique is not limited in applicability to merchants and customers, nor to the sales of goods. The technique can be utilized with essentially any transaction that traditionally would be initiated by or involve the use of a card reader. Hence, the term "sale", as in point-of-sale (POS) for example, refers to any type of payment-oriented transaction, including for example a lease, a rental, or services, and is not limited to an actual purchase. Note also that in this description the terms "customer" or "payer" generally refer to the person (or other entity) making the payment related to the transaction, while "merchant" or "payee" generally refer to the person (or other entity) receiving the payment related to the transaction.

FIG. 1 illustrates a process for paying for a purchase using a proxy card in accordance with various aspects of the disclosed technology. A proxy card has several characteristics. For purposes of this disclosure, a proxy card is a payment card that is: 1) capable of being used to initiate an electronic payment; 2) capable of being associated with multiple financial accounts, where funds for an electronic payment initiated using the proxy card can be obtained based on one or more of the multiple financial accounts; and 3) associated with a specified set of people or entities who are authorized users of the proxy card, such as by a maintained list of person(s) or entity(ies) who are authorized to use the proxy card.

In contrast, a monetary value card is a payment card that is not issued in the name of any person or entity, but rather can be used by any person who rightfully has possession of the card to make a payment. Further, a monetary value card has no associated credit account or credit funds, but rather has an associated zero or positive monetary value that is stored at a financial account associated with the monetary value card, or that is stored on the card itself. Examples of monetary value cards include gift cards and stored-value cards. A person, such as a purchaser of a monetary value card, can add funds to the monetary value of the monetary value card by, for example, providing funds to a merchant that sells the monetary value card. The merchant can add the funds, less any associated fees, to the monetary value of the monetary value card.

A monetary value card may not be associated with a defined set of people and/or entities who are authorized users of the monetary value card, and may resultantly not be a proxy card. For example, a monetary value card that can be used anonymously (referred to herein as an "anonymous monetary value card") is not associated with a defined set of people and/or entities who are authorized users of the monetary value card, and is therefore not a proxy card. Like cash, an anonymous monetary value card can legally be used to pay for a financial transaction by anyone who rightfully has possession of the card.

For example, a first person who rightfully has possession of an anonymous monetary value card can physically give the card to a second person who is a stranger to the first person (i.e., the first person has no knowledge of the identity of the second person, and vice versa). The second person, now having rightful possession of the anonymous monetary value card, can rightfully use the card to electronically pay for a financial transaction. An anonymous monetary value card is not associated with a defined set of people or entities who are authorized users of the proxy card (i.e., there is no list of authorized users that is maintained), but rather any person who has rightful possession of the anonymous monetary value card can legally use the card.

A proxy card can be indicated in several ways. In a first example, a proxy card can be indicated based on meta-data of the proxy card. In the first example a first proxy card is similar to a credit card. The first proxy card has a magnetic stripe that can be read by a card reader that is compatible with payment cards such as credit cards, debit card, etc. The first proxy card can be indicated to be a proxy card by meta-data of the first proxy card, such as meta-data that is stored via a magnetic stripe of the first proxy card, and that can be read based on the magnetic stripe during a "swipe" of the first proxy card by the card reader. The meta-data can indicate that the first proxy card is a proxy card by, e.g., including data that enables an electronic payment based on the card to be routed to a computer associated with an internet protocol (IP) address or a phone number that is included in the meta-data.

A proxy card need not include meta-data that indicates that the card is a proxy card. As a second example, a proxy card can be indicated by association information that is stored at a computer. In the second example, a computer system has access to association information that is stored at a storage device. The association information associates payment card information with information that indicates whether the payment card is a proxy card. The payment card information is information obtained based on the payment card, such as information stored at the magnetic stripe of the payment card and that can be read by a card reader during a "swipe" of the payment card at the card reader. The payment card information can further, or alternately, include information that can be obtained by a visual inspection of the payment card, such as an account number that is visible on the proxy card.

A computer system that has access to the association information can obtain an indication whether a particular payment card is a proxy card based on the payment card information. For example, the computer system can access the stored association information based on the payment card information of the particular payment card, such as via a database access based on the payment card information. The database can return data that indicates whether the payment card is a proxy card, such as a listing of financial accounts that are associated with the payment card, or a simply a logical true or false that indicates whether the payment card is a proxy card. A computer system of a financial system, such as a computer system of financial system 160 of FIG. 5A, may not have access to the association information.

Figure 5A:
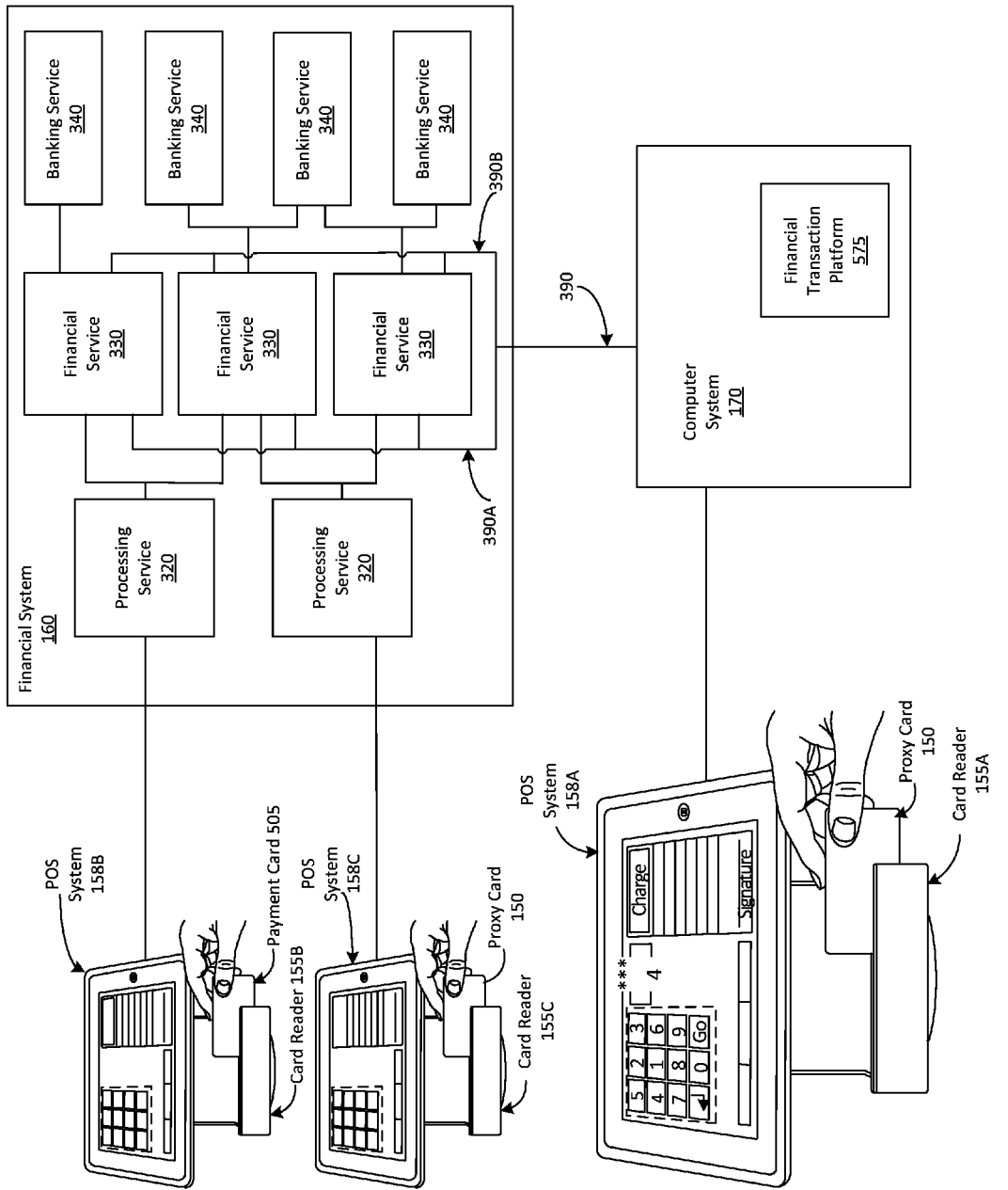
FIG. 5A is an illustration of a sixth embodiment of a financial system for processing financial transactions and associated fund transfers.

When a proxy card is indicated to be a proxy card based on association information stored at a computer system, rather than based on meta-data of the proxy card, an electronic payment based on one of the accounts linked to the proxy card via the association information may need to pass through an intermediary computer system that has access to the association information, such as computer system 170 of FIG. 5A, before passing to a financial system, such as financial system 160 of FIG. 5A.

An example will be discussed. A payment card that is a credit card, a charge card, a debit card, or an automated teller machine (ATM) card can be a proxy card. In the example, a credit card was issued in the name of a user, and was associated with a credit account at the time of issue. Later, the user linked a second financial account to the credit card, such as a financial account associated with a debit card or a gift card, via a database stored at computer system 170 of FIG. 5A. The database stores association information that associates proxy cards with financial accounts. The credit card of this example is a proxy card that does not include the meta-data that indicates that the credit card is a proxy card. Rather, the association information stored at computer system 170 indicates that the credit card is a proxy card.

When an electronic payment is initiated, but does not pass through an intermediary computer system with access to the association information before passing to a financial system, the electronic payment cannot be based on one of the financial accounts that is associated with the credit card via the association information. For example, if an electronic payment is initiated based on the credit card of this example at either POS system 158B or POS sys 158C of FIG. 5A, the electronic payment cannot be based on the second financial account that is associated with the credit card via the association information. This is because the electronic payment does not pass through computer system 170, which has access to the association information, before passing to financial system 160. The electronic payment can be based on the credit account that was associated with the credit card at the time of issue.

When an electronic payment is initiated and passes through an intermediary computer system with access to the association information before passing to a financial system, the electronic payment can be based on one of the financial accounts that is associated with the credit card via the association information. For example, if an electronic payment is initiated based on the credit card of this example at POS system 158A of FIG. 5A, the electronic payment can be based on the second financial account that is associated with the credit card via the association information. This is because the electronic payment passes through computer system 170, which has access to the association information, before passing to financial system 160. Computer system 170 can relay the electronic payment to financial system 160, but with the proxy card information replaced with information of the second financial account, where the information of the second financial account is obtained from the database. This will be discussed in more depth below.

The example process illustrated in FIG. 1 has three phases. The first phase is card swipe 105. A consumer has proxy card 150, which in this example is a magnetic stripe card physically similar to a credit card. Multiple payment accounts are associated with proxy card 150 including several credit cards, a debit card, an ATM card, and a prepaid gift card. The payment accounts are associated with proxy card 150, such as by being linked to proxy card 150. The links can be implemented using a database that associates proxy card 150 with the payment accounts. For a discussion as to how these links may be implemented, refer to the discussion of object 250 of FIG. 2.

The consumer presents proxy card 150 to a seller to pay for a purchase. The seller executes card swipe 105, which includes step 103, in which the seller swipes proxy card 150 through card reader 155, and step 108, in which card reader 155 transmits information obtained from proxy card 150 to POS system 158, a point-of-sales (POS) system to which card reader 155 is coupled (either directly or indirectly).

POS system 158 then begins the second phase, which is payment authorization 130. Payment authorization 130 includes steps for obtaining an authorization for the payment and includes steps 110, 115, 120, 125, and 180. Payment authorization 130 starts with step 110. At step 110 POS system 158 initiates transmission of information associated with proxy card 150, i.e., the proxy card information, to financial system 160. In this example, the proxy card information includes identifying information for the proxy card and meta-data which can be used to determine that proxy card 150 is a proxy card, among other purposes. POS system 158 is agnostic to what financial system 160 and proxy card 150 are. As far as POS system 158 can tell, proxy card 150 is no different than other payment cards, and sending information to financial system 160 for proxy card 150 is no different than sending information for other payment cards.

POS system 158 further transmits information associated with the purchase transaction, referred to herein as the transaction information, to financial system 160. The transaction information includes the amount of the transaction, and can further include information regarding the payee and individual line items from the transaction, among other information. At step 110, financial system 160 receives the proxy card information and the transaction information. At step 115, financial system 160 parses the meta-data and determines, based on the meta-data, to send a message to computer system 170. The message sent to computer system 170 at step 115 can include all or part of the proxy card information and the transaction information, among other information. The meta-data can include data such as an IP address or a phone number that indicate where the message should be sent.

Computer system 170, upon receiving the proxy card information, accesses a database access to obtain payment account information associated with proxy card 150. At step 180, computer system 170 applies an algorithm, which in some embodiments is customized by the consumer, to select the payment account to use for the purchase transaction. At step 120, computer system 170 transmits the transaction information and the payment account information to financial system 160, and financial system 160 determines the results of payment authorization 130 using the selected payment account. If the payment account has access to adequate funds for the payment, and no other issue exists, financial system 160 determines that the result of payment authorization 130 is that the payment is authorized.

If some issue exists, such as the payment account does not have access to adequate funds for the payment or the payment account has a fraud alert, financial system 160 determines that the result of payment authorization 130 is that the payment is declined. Other results, such as declining the purchase transaction and instructing the seller to take possession of the proxy card, or additional information, such as an authorization number, can be transmitted to financial system 160 at step 120. At step 125, financial system 160 transmits the results of payment authorization 130 to POS system 158.

In some embodiments, instead of financial system 160 determining and sending the results of payment authorization 130, computer system 170 determines and sends the results of the payment authorization. Computer system 170 decides the payment authorization based on information such as the consumer's credit reports or scores and the history of past payments processed by computer system 170. Computer system 170 sends the payment authorization results to POS system 158, or to financial system 160, which relays the results to POS system 158.

At this point, assuming that the purchase transaction was authorized and the consumer accepted the purchase transaction, the purchase transaction is complete and the consumer is free to walk out of the store with the purchased items. At a later time, for example when the consumer arrives at home, the consumer can optionally start phase 3, change of payment account 145. If the consumer does not utilize this phase, financial system 160 will transfer funds for the payment from the selected payment account to an account associated with the seller, such as by debiting the funds from the payment account and crediting the funds to the account associated with the seller. However, during this phase, the consumer can select a second different payment account from which funds to for the payment are to be obtained.

The consumer uses personal computing device 165, for example a smartphone or a laptop computer, to initiate change of payment account 145 which includes steps 135, 140, and 175. At step 135, personal computing device 165 communicates with computer system 170 to initiate change of payment account 145. At step 140, computer system 170 provides information regarding the purchase transaction to the consumer via personal computing device 165. Examples of the information provided include the date of the purchase, information regarding the seller, and the amount of the purchase. Computer system 170 further provides information regarding the payment accounts associated with proxy card 150 to the consumer via personal computing device 165. Computer system 170 has access to a database containing various information associated with proxy card 150, as well as information associated with the consumer and/or the payment accounts associated with proxy card 150.

When there are multiple payment accounts associated with proxy card 150, the consumer, using personal computing device 165, can select any payment account associated with proxy card 150 from which funds for the payment are to be obtained. At step 140, personal computing device 165 transmits information indicating the selection to computer system 170. After the selection is made, at step 175 computer system 170 transmits information related to the selection, such as identifying information for the selected payment account, to financial system 160, which causes financial system 160 to obtain funds for the purchase based on the selected payment account, such as by debiting the selected payment account. Computer system 170 additionally prevents the funds from being obtained from the initially selected payment account, such as by canceling the payment initially to be obtained from the initially selected payment account.

Figure 2:
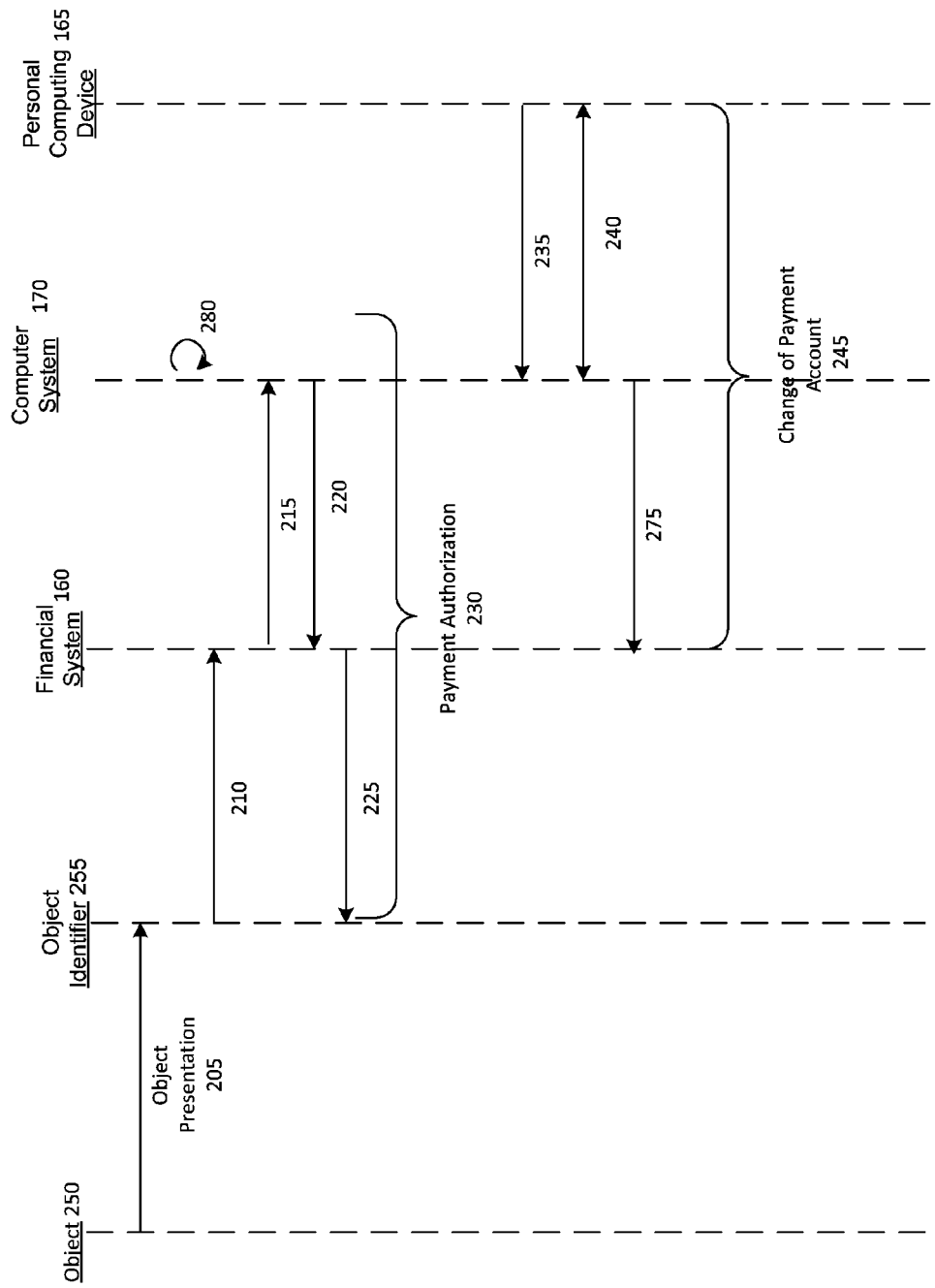
FIG. 2 is an illustration of a process for paying for a purchase using a payment object.

FIG. 2 is an illustration of a process for paying for a purchase using a payment object in accordance with various aspects of the disclosed technology. In the example illustrated in FIG. 2, the purchase process has three phases. The first phase is object presentation 205. A consumer has object 250, which is referred to herein interchangeably as a "proxy object" and a "payment object." Object 250 has associated payment accounts, and can be a proxy card with associated payment accounts. Object 250 can have the several characteristics of a proxy card that are discussed in the description of FIG. 1. The consumer presents object 250 to the seller to pay for a purchase. Because object 250 is compatible with financial system 160, object 250 can be presented to the seller in a way that enables the seller to obtain information related to object 250 sufficient to enable initiation of payment authorization 230.

As a first example, object 250 can be proxy card 150 of FIG. 1. Object presentation 205 includes presenting the proxy card so that the proxy card can be read by object identifier 255. In this example, object identifier 255 is a POS system including a card reader in which the card reader is able to obtain information associated with object 250 (i.e., the proxy card) sufficient to initiate payment authorization 230. As a second example, object 250 can be a finger. Object presentation 205 includes presenting the finger so that the fingerprint of the finger can be read by object identifier 255. In this second example, object identifier is a biometric finger scanner capable of obtaining information related to object 250 (i.e., the finger) sufficient to enable initiation of payment authorization 230.

Object identifier 255 begins the second phase, which is payment authorization 230 and includes steps 210, 215, 220, 225, and 280. Payment authorization 230 includes the steps for obtaining authorization for the payment related to the purchase transaction. Payment authorization 230 starts with step 210. At step 210, object identifier 255 obtains object information associated with object 250. For example, a POS system obtains proxy card information from the proxy card. Step 210 continues with the transmission of the object information to financial system 160, for example the POS system transmits the proxy card information to financial system 160. Information related to the purchase transaction (i.e., the transaction information), such as the amount of the purchase, is also transmitted to financial system 160.

Object identifier 255 is, for example, a card reader which transmits the object information and the transaction information to financial system 160. Financial system 160 receives the transmitted information, and based on this information, decides to relay the transmitted information to computer system 170 for further processing. At step 215, financial system 160 relays the transmitted information, along with other information, to computer system 170.

For example, financial system 160 receives the transmitted proxy card information, which includes meta-data, and the purchase amount. Upon receiving the proxy card information, and based on the proxy card information, financial system 160 decides to relay the transmitted information to computer system 170. At this point in time, financial system 160 does not have the information needed to complete or authorize the purchase transaction, as financial system 160 without computer system 170 is not able to determine a payment account associated with the proxy card to use for the purchase transaction.

Computer system 170, upon receiving the proxy card information, accesses a database to obtain payment account information associated with the proxy card information. At step 280, computer system 170 applies an algorithm, which in some embodiments can be customized by the consumer, to select the payment account to use for the purchase transaction. The following are example algorithms which can additionally be used for step 180 of FIG. 1. 1) When there are multiple payment accounts associated with object 250 and until changed by the consumer or some other entity, the same one payment account is used for all payments made using object 250. 2) The payment account used can be different for each purchase transaction as well as for each line item of a purchase transaction based on a payment account selection algorithm.

For example, a consumer can use a proxy card to purchase gas and a snack item at a gas station as part of a single purchase transaction. For this purchase transaction, the payment account selection algorithm can select a gas credit card associated with the proxy card for the gas line item, and can select a VISA credit card associated with the proxy card for the snack line item. In some embodiments, the consumer can set, modify, or change the algorithm for selecting the payment account to use for a purchase transaction. In some embodiments, the algorithm is based on inputs received from the consumer.

At step 220, computer system 170 transmits the transaction information and the payment account information to financial system 160, and financial system 160 determines the results of payment authorization 230 using the selected payment account. If the payment account has access to adequate funds for the payment, and no other issue exists, financial system 160 determines that the result of payment authorization 230 is that the payment is authorized.

If some issue exists, such as the payment account does not have access to adequate funds for the payment or the payment account has a fraud alert, financial system 160 determines that the result of payment authorization 230 is that the payment is declined. Other results, such as declining the purchase transaction and instructing the seller to take possession of the proxy card, or additional information, such as an authorization number, can be transmitted to financial system 160 at step 220. At step 225, financial system 160 transmits the results of payment authorization 230 to object identifier 255.

In some embodiments, instead of financial system 160 determining and sending the results of payment authorization 230, computer system 170 determines and sends the results of the payment authorization. Computer system 170 decides the payment authorization based on information such as the consumer's credit reports or scores and the history of past payments processed by computer system 170. Computer system 170 can send the payment authorization results to object identifier 255, or can send the results to financial system 160, which can relay the results to object identifier 255.

At this point, assuming that the purchase transaction was authorized and the consumer accepted the purchase transaction, the purchase transaction is complete and the consumer is free to walk out of the store with the purchased items. At a later time, for example when the consumer arrives at home, the consumer can optionally start phase 3, change of payment account 245. If the consumer does not utilize this phase, financial system 160 will transfer funds for the payment from the selected payment account to an account associated with the seller. However, during this phase, the consumer can select a second different payment account from which funds for the payment are to be obtained.

The consumer uses personal computing device 165, for example a smartphone or a laptop computer, to initiate change of payment account 245, which includes steps 235, 240, and 275. At step 235, personal computing device 165 communicates with computer system 170 to initiate change of payment account 245. At step 240, computer system 170 provides information regarding the purchase transaction to the consumer via personal computing device 165. Examples of the information provided include the date of the purchase, information regarding the seller, and the amount of the purchase. Computer system 170 further provides information regarding the payment accounts associated with object 250 to the consumer via personal computing device 165. Computer system 170 has access to a database containing various information associated with object 250 as well as associated with the consumer and the payment accounts associated with object 250.

When there are multiple payment accounts associated with object 250, the consumer, using personal computing device 165, can select any payment account associated with object 250 from which funds for the payment are to be obtained. At step 240, personal computing device 165 transmits information indicating the selection to computer system 170. After the selection is made, at step 275 computer system 170 transmits information related to the selection, such as payment account information, to financial system 160. This causes financial system 160 to obtain funds for the payment from the selected payment account. Computer system 170 additionally prevents the funds from being obtained from the initially selected payment account, such as by canceling the payment from the initially selected payment account. The funds can correspond to the amount of the purchase, the amount of a line item, the amount of multiple line items, or some other amount corresponding to the purchase, and can be transferred to an account associated with the seller. The funds transferred can correspond to an amount by being for the amount less a transaction fee. Further, purchase transactions can be batched, and the funds can be for an amount corresponding to the amount of the batch of purchase transactions.

Object 250 is compatible with financial system 160. In various embodiments, object 250 can be a magnetic stripe card, a smart card, a proximity card, a re-programmable magnetic stripe card, an card containing an optical code such as a quick response (QR) code or a bar code, or a biometrically identifiable object, such as a finger, a hand, an iris, a retina, or a face, among others. Object 250 can be associated with various payment objects and payment object accounts, including accounts associated with credit cards, charge cards, ATM cards, debit cards, pre-paid credit cards, pre-paid debit cards, gift cards, pre-paid gift cards, stored value cards, and fleet cards, among others. The payment accounts can be associated with object 250 by, for example, being linked to object 250. The link can be implemented, for example, using a database which links object 250 with the payment accounts.

In an embodiment, object 250 is a proxy card implemented as a magnetic stripe card similar to a credit card. The proxy card has an account number similar to a credit card, but, unlike a credit card or debit card, the account number is not linked to a particular bank or credit union. Instead, swiping the proxy card, as one would swipe a credit card, triggers the sending of transaction information and proxy card information to a secondary payment processor. The secondary payment processor creates and maintains a database that links the proxy card with the payment accounts. A customer can link various payment card accounts with the proxy card by logging in to a website associated with the secondary payment processor, and entering information into the website that enables the link. For example, the account number of the proxy card, and the account number of a payment card can be entered, and the secondary payment processor can link the two.

Linking can be done by taking photos of the proxy card and the payment card and sending the photos to the secondary payment processor, which can obtain the information needed to link the cards from the photos. The photos can be taken by a mobile device, and an application running on the mobile device can send the photos to the secondary payment processor. Linking can be done by swiping the two cards through a card reader connected to the customer's mobile device, and sending the data obtained by the card reader to the secondary payment processor. An application running on the mobile device can obtain the information for the two card from the card reader, and can send the data obtained by the card reader to the secondary payment processor.

In some embodiments, the proxy card has a visible number on its face, similar to a credit card. In some embodiments, the proxy card has no visible number. In an embodiment with no visible number, information for the proxy card is obtained from the magnetic stripe of the proxy card. In some embodiments, information for the proxy card is obtained via Bluetooth Low Energy (BLE), near field communications (NFC), or other contactless payment mechanism embedded in the proxy card that triggers payment using a POS system.

Further, object 250 can be associated with loyalty programs, wherein the loyalty programs are another type of payment account which can be used to make the purchase. In some embodiments, object 250 can be a mobile device. Examples of mobile devices include smartphones, tablets, portable media devices, wearable devices, laptops, and other portable computers. In some embodiments, when object 250 is a mobile device, the mobile device includes a digital wallet application that triggers payment using a POS system.

Object identifier 255 can obtain information associated with object 250, where the information is part of the object information. In embodiments where object 250 is a magnetic stripe card or a re-programmable magnetic stripe card, object identifier 255 can read the magnetic stripe. In embodiments where object 250 is a smart card, object identifier 255 can communicate with the smart card to obtain information related to object 250. In embodiments where object 250 is a proximity card, object identifier 255 can cause the proximity card to transmit information associated with the proximity card, such as a radio frequency identification (RFID), which object identifier 255 can receive. In embodiments where object 250 is a card with an optical code such as a QR code or bar code, object identifier 255 can obtain the optical code, for example, by scanning the optical code. In embodiments where object 250 is a mobile device, object identifier 250 can communicate with the mobile device to obtain information related to object 250, such as via 3G, 4G, WiFi, Bluetooth, or BLE. Object identifier 255 can further transmit the object information to financial system 160.

Object identifier 255 can further include a sales system, such as POS system 158 of FIG. 1. Examples of sales systems include point-of-sale (POS) systems, cash registers, computer systems running sales applications including mobile devices running sales applications, cloud based POS systems, checkout registers, computer systems running internet based applications such as a web browser, and the like.

In embodiments where object 250 is a biometrically identifiable object, such as a finger, a hand, an iris, a retina, or a face, object identifier 255 can identify the biometrically identifiable object or can obtain information from the biometrically identifiable object and can transmit that information to a computer system that can use the information to identify the biometrically identifiable object. For example, when the biometrically identifiable object is a finger, object identifier 255 can obtain data related to the fingerprint of the finger. In some embodiments, object identifier 255 can recognize the fingerprint to identify the finger (e.g., this is the finger of Jane Doe). For example, object identifier 255 can include a biometric scanner coupled to a computer system such as a POS system, wherein the biometric scanner can scan the consumer's fingerprint, can transmit the biometric scan results to the computer system to which the biometric scanner is coupled, and the computer system can use the consumer's fingerprint to identify the finger. In other embodiments, object identifier 255 can transmit the data related to the fingerprint to a second computer system, for example, to a compute server associated with the seller, to financial system 160, to computer system 170, or to another computer system, and the second computer system can use the transmitted fingerprint data to identify the finger. The second computer system can transmit identifying information associated with the finger to object identifier 255, where the identifying information is part of the object information. Object identifier 255 can further transmit the object information to financial system 160.

In embodiments where object 250 is a mobile device, object identifier 255 can obtain identifying information associated with the mobile device. In one example where object 250 is a smartphone, object identifier 255 can communicate with the smartphone via 3G to obtain identifying information related to a digital wallet associated with the smartphone, where the identifying information is part of the object information. Object identifier 255 in various embodiments can communicate with the mobile device via WiFi, 3G, 4G, Near Field Communication (NFC), or Bluetooth, or can obtain an optical code such as a QR code or a bar code or any machine readable code from the mobile device, for example, by scanning an optical code displayed by the mobile device. Object identifier 255 can further transmit the object information to financial system 160.

Personal computing device 165 can be a mobile device. Examples of mobile devices include smartphones, tablets, portable media devices, wearable devices, laptops, and other portable computers. Personal computing device 165 can further be a non-portable computer, such as a desktop computer.

Object 250 can be associated with multiple payment accounts, and a loyalty program can be a payment account. A seller may be motivated to encourage certain behaviors in consumers. For example, the seller may want the consumer to return to the seller's store, or to purchase a certain item, or to return to the store at a certain time or during a certain time window and make a purchase. To encourage behaviors such as these, a seller can participate in or offer a loyalty program. The seller can provide loyalty points or some equivalent for each purchase made by a consumer. By coming back to the seller's store and making additional purchases, the consumer can grow his loyalty points. The loyalty points can be redeemed for purchases made at the seller's store or another of the seller's stores or with other businesses that participate in the loyalty program.

In addition to encouraging loyalty to a store or a brand by providing loyalty points for purchases made at the store or for brand products, a seller can use the loyalty program to encourage other behaviors. For example, if the store has a slow period, such as a coffee shop is slow between 3 pm and 4 pm, the store owner can, in order to give consumers incentive to make purchases at the store during this slow time, offer increased loyalty points for purchases made between 3 pm and 4 pm at the store. The store owner can also offer increased redemption value for a consumer's loyalty points, or can lower the cost of products or services in terms of loyalty points, during this time window. For example, the store owner could offer to redeem 100 loyalty points and provide 150 points of value, or could reduce an item that normally costs 150 loyalty points to 100 loyalty points, for purchases made between 3 pm and 4 pm. As another example, if a business owner wants to encourage consumers to purchase a new item that the business owner is introducing, the business owner can offer increased loyalty points to consumers for purchasing this new item. The business owner can also offer increased loyalty point redemption value or reduced loyalty point costs to a consumer for purchasing this new item using loyalty program points. For example, if the new item can be normally purchased with 150 loyalty points, the business owner can offer 150 points of loyalty program value for 100 redeemed loyalty points to a consumer for purchasing this new item, or the business owner can reduce the cost of the new item to 100 loyalty points.

Figure 3A:
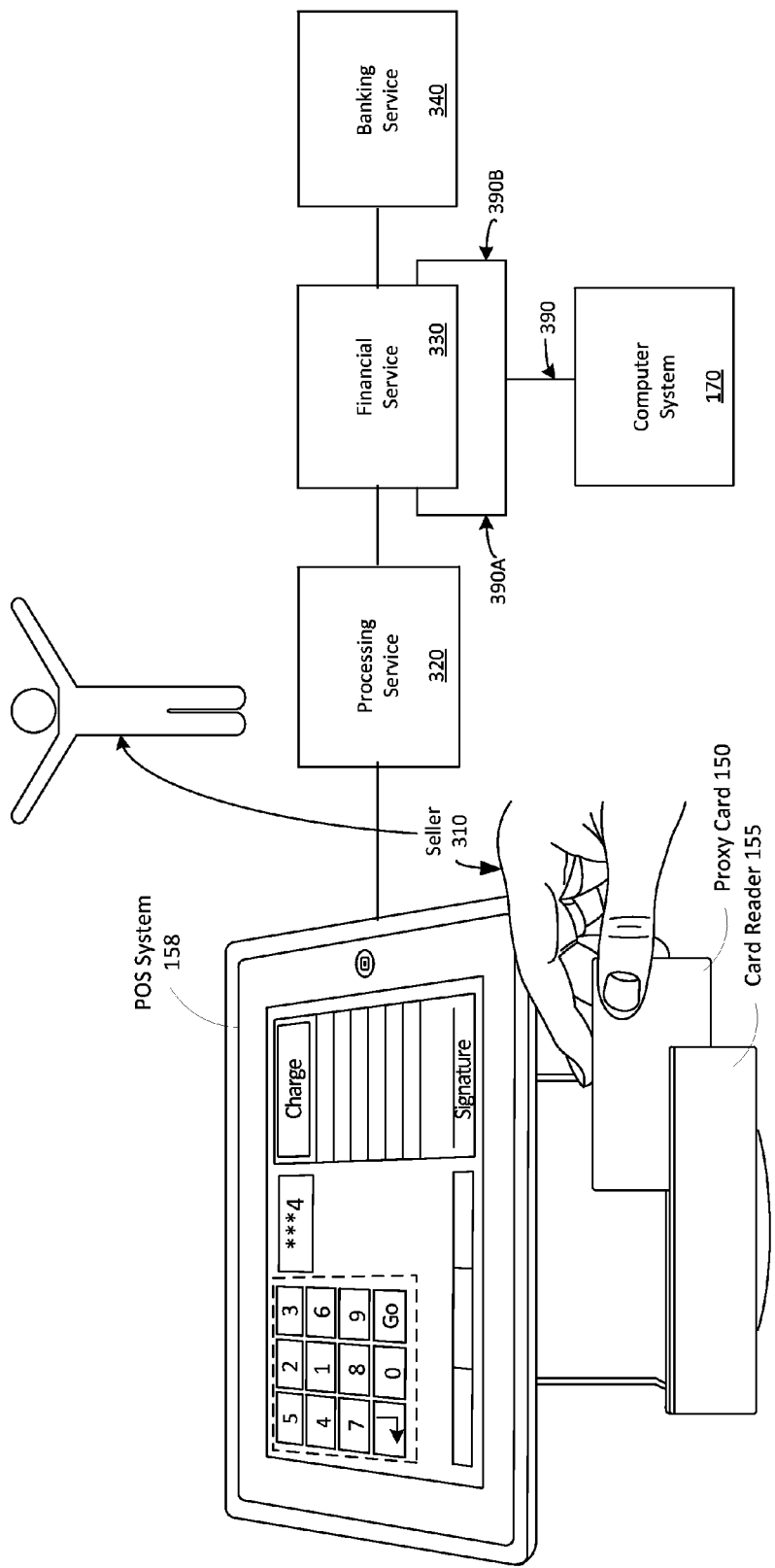
FIG. 3A is an illustration of a first embodiment of a financial system for processing financial transactions and associated fund transfers.
Figure 5B:
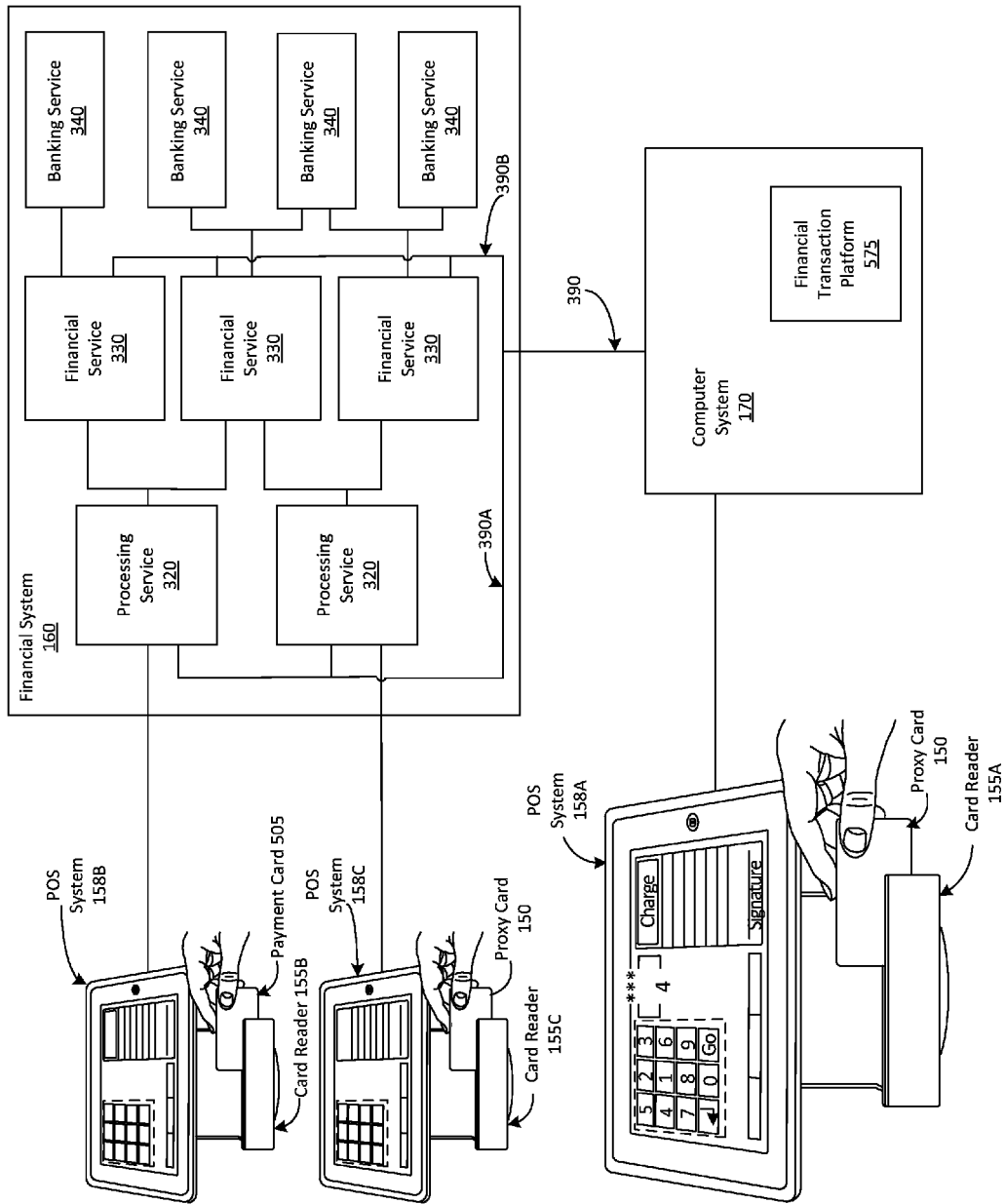
FIG. 5B is an illustration of a seventh embodiment of a financial system for processing financial transactions and associated fund transfers.

FIG. 3A is an illustration of a first embodiment of a financial system for processing purchase transactions and associated fund transfers. The following description of FIG. 3A will be described using the transaction illustrated in FIG. 1, and will refer to labels of that figure. FIG. 3A contains the subset of the components of FIG. 5A that are relevant to explaining the transaction illustrated in FIG. 1. The following description of FIG. 3A also applies to FIG. 3B, except where differences are noted. All actions, decisions, determinations, and the like which are taken or received by computer system 170 can also be taken or received by financial transaction platform 575 when computer system 170 includes an implementation of financial transaction platform 575, as is represented in FIGS. 5A and 5B.

The transaction of this example starts with a consumer presenting proxy card 150 to seller 310. Seller 310 initiates card swipe 105 at step 103 by swiping proxy card 150 through card reader 155. Card reader 155 at step 108 then sends the information obtained from proxy card 150, the proxy card information, to POS system 158. Card reader 155 is coupled to POS system 158. Payment authorization 130 starts at step 110 with POS system 158 transmitting the proxy card information to financial system 160. In the example of FIG. 1, proxy card 150 is configured as a VISA branded payment card, such as by being encoded as a VISA branded payment card.

Figure 4A:
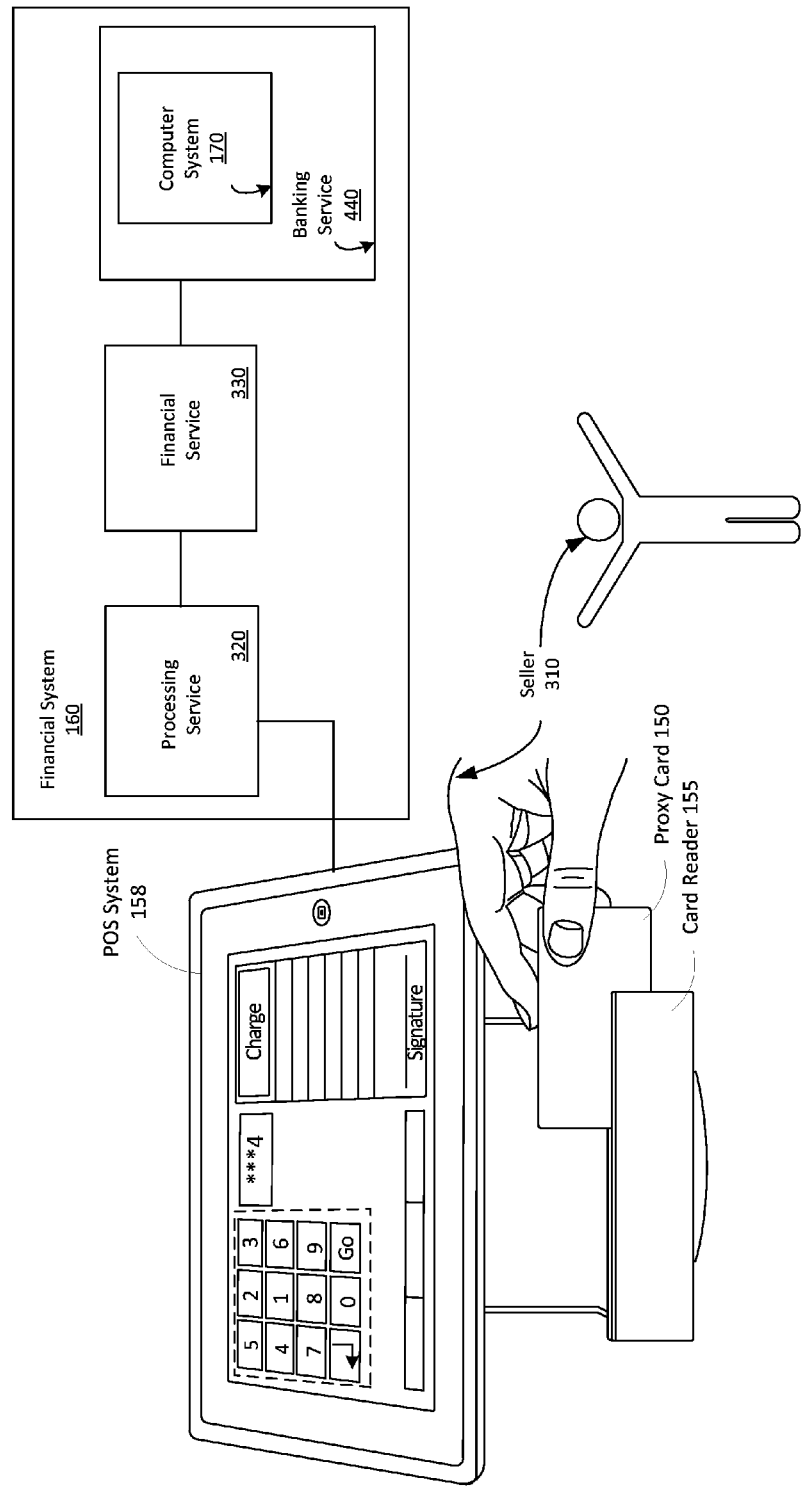
FIG. 4A is an illustration of a third embodiment of a financial system for processing financial transactions and associated fund transfers.
Figure 4B:
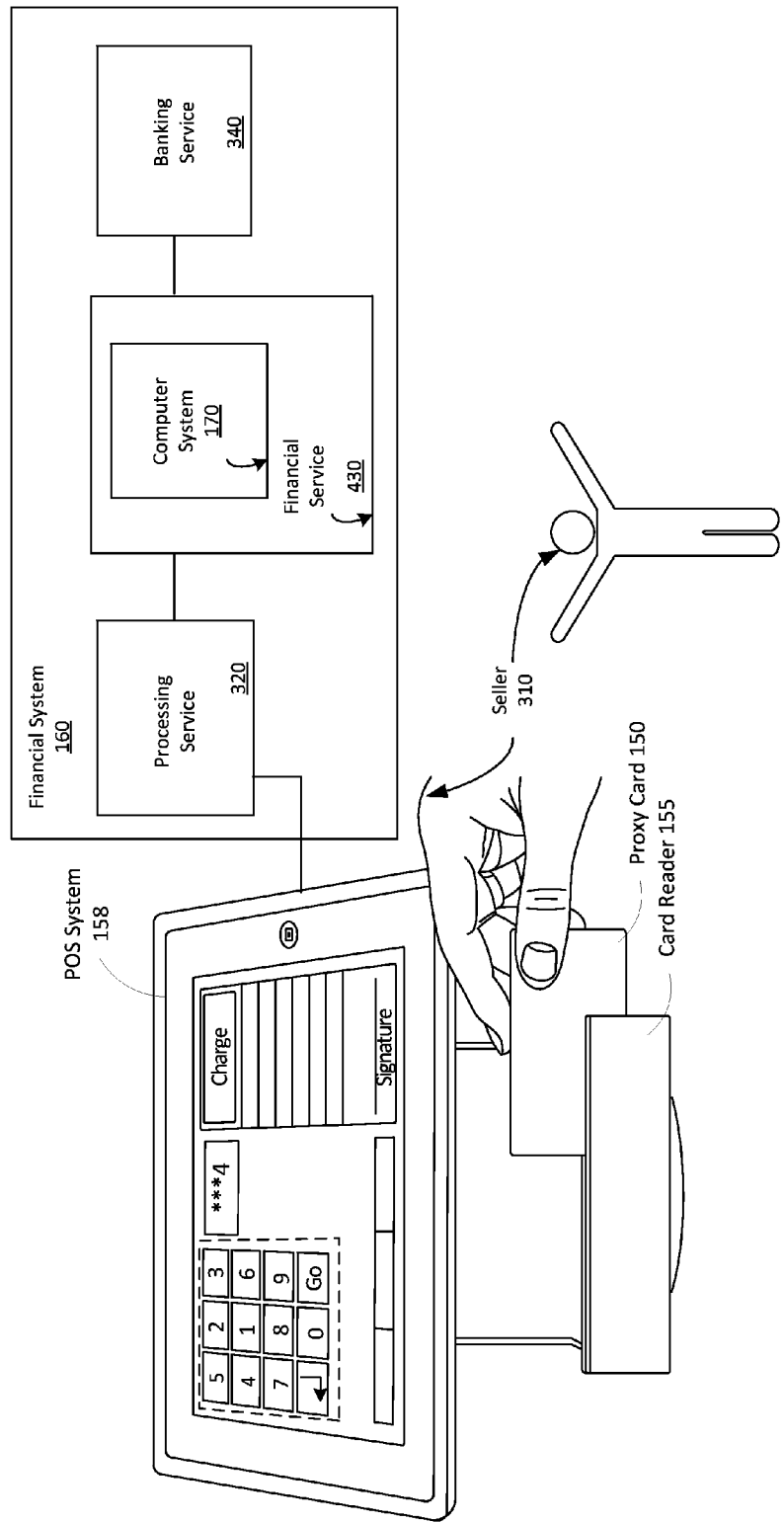
FIG. 4B is an illustration of a fourth embodiment of a financial system for processing financial transactions and associated fund transfers.
Figure 4C:
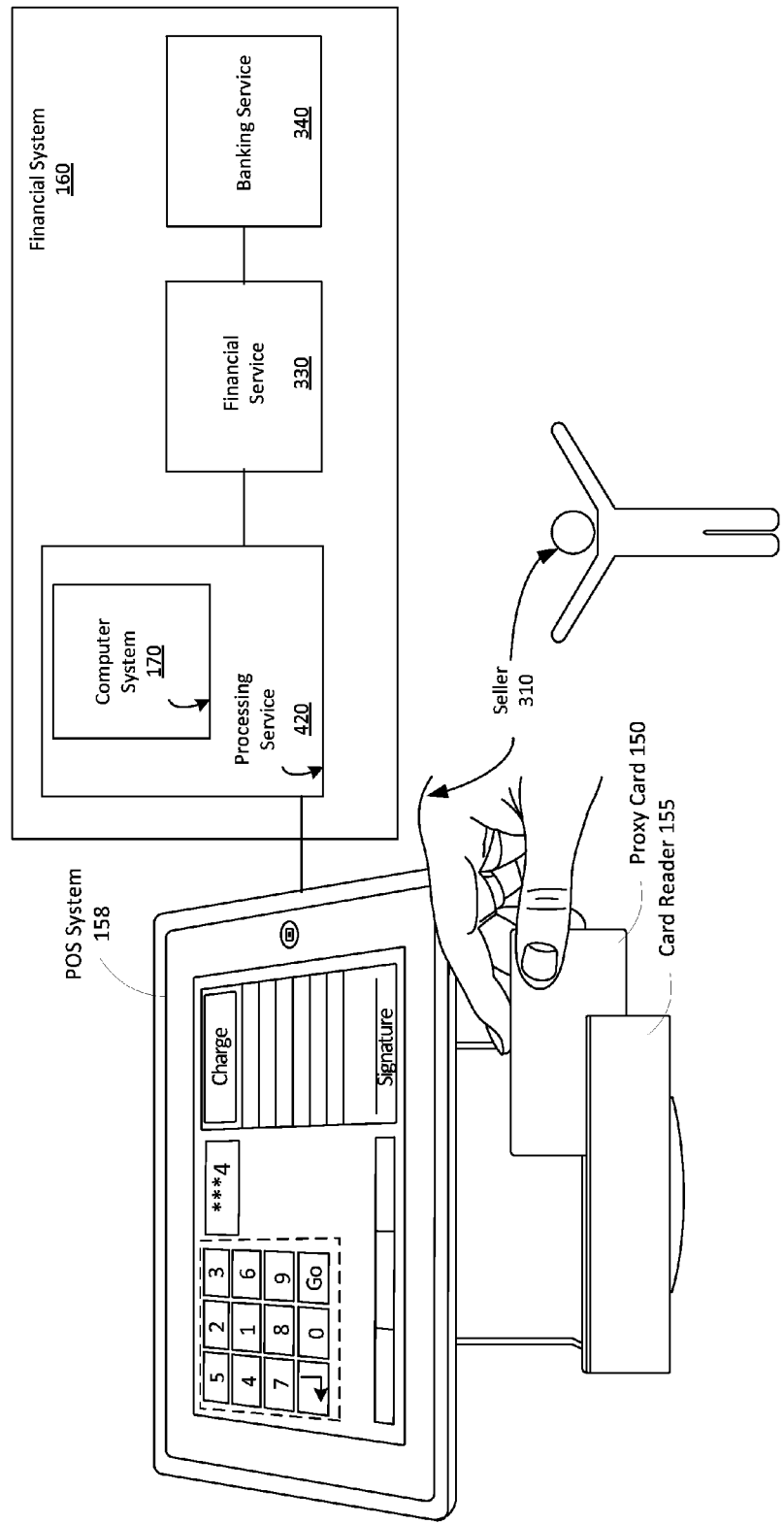
FIG. 4C is an illustration of a fifth embodiment of a financial system for processing financial transactions and associated fund transfers.

In the embodiment of FIG. 3A, financial system 160 includes processing service 320, financial service 330, and banking service 340. In some embodiments, financial system 160 can include computer system 170, such as in the embodiments of FIGS. 4A-4C. FIGS. 4A-4C are illustrations of, respectively, a third, fourth, and fifth embodiment of a financial system. In the embodiment of FIG. 4A, computer system 170 is under the control of banking service 440. In the embodiment of FIG. 4B, computer system 170 is under the control of financial service 430. In the embodiment of FIG. 4C, computer system 170 is under the control of processing service 420.

POS system 158 at step 110 transmits the proxy card information to financial system 160, where the proxy card information is received by processing service 320. An example of processing service 320 is Bank of America Merchant Services. Processing service 320, based on the received proxy card information, determines that proxy card 150 is encoded as a VISA branded payment card. Based on this determination, processing service 320 relays the received information to the financial service that processes VISA branded payment cards. In various embodiments, financial service 330 can be a debit card payment network such as STAR or PULSE, a credit card payment network such as Visa's VisaNet Payment system or MasterCard's BankNet network, etc. In this example, financial service 330 is VISA's VisaNet Payment System, which processes payments made using VISA branded payment cards.

The proxy card information includes meta-data which financial service 330 uses to determine to transmit the proxy card and transaction information to computer system 170. As illustrated in FIGS. 4A-4C, in various embodiments computer system 170 can be under the control of a processing service, a financial service, or a banking service. Financial service 330, upon determining to transmit information associated with proxy card 150 to computer system 170, performs step 115 in which financial service 330 transmits information associated with proxy card 150 to computer system 170.

Connector 390 shows two connections to financial service 330 in order to facilitate explaining the example of FIG. 3A. This is not intended to represent two connections, or any specific number of connections. Connector 390 represents an information flow made via any type of communications medium, such as a network (wired or wireless). Label 390B represents a flow of information that is generally from financial system 160 to computer system 170, such as occurs at step 115. In the embodiments of FIGS. 5A and 5B, the information flow of step 115 is generally from financial service 330 to computer system 170. Label 390A represents a flow of information that is generally from computer system 170 to financial system 160, such as occurs at steps 120 and 175. In the embodiment of FIG. 5A, the information flow of steps 120 and 175 is generally from computer system 170 to financial service 330. In the embodiment of FIG. 5B, the information flow of steps 120 and 175 is generally from computer system 170 to processing service 320.

Computer system 170 at step 180 selects the payment account to use for the purchase transaction, which in this example is also a VISA branded payment card account. Computer system 170 performs step 120 which includes sending the transaction information and the payment account information to financial system 160. In the financial system embodiment of FIG. 3A, this includes sending the transaction and payment account information to financial service 330, as is represented by the branch of connector 390 that is labeled 390A. Computer system 170 sends the transaction and payment account information to financial service 330 based on a determination that the selected payment account is a VISA branded payment account, and based on a determination that financial service 330 is the financial service that processes payments made using VISA branded payment cards.

As is represented by label 390A of FIG. 5A, computer system 170 can send the transaction and payment account information to different financial services when payments from the selected payment account are processed by other financial services. Financial service 330 determines that the payment account is managed by banking service 340, and sends the transaction and payment account information to banking service 340. An example of a banking service is Chase Bank. Banking service 340 determines the result of payment authorization 130, and in step 125 sends the results of the authorization to POS system 158.

Figure 3B:
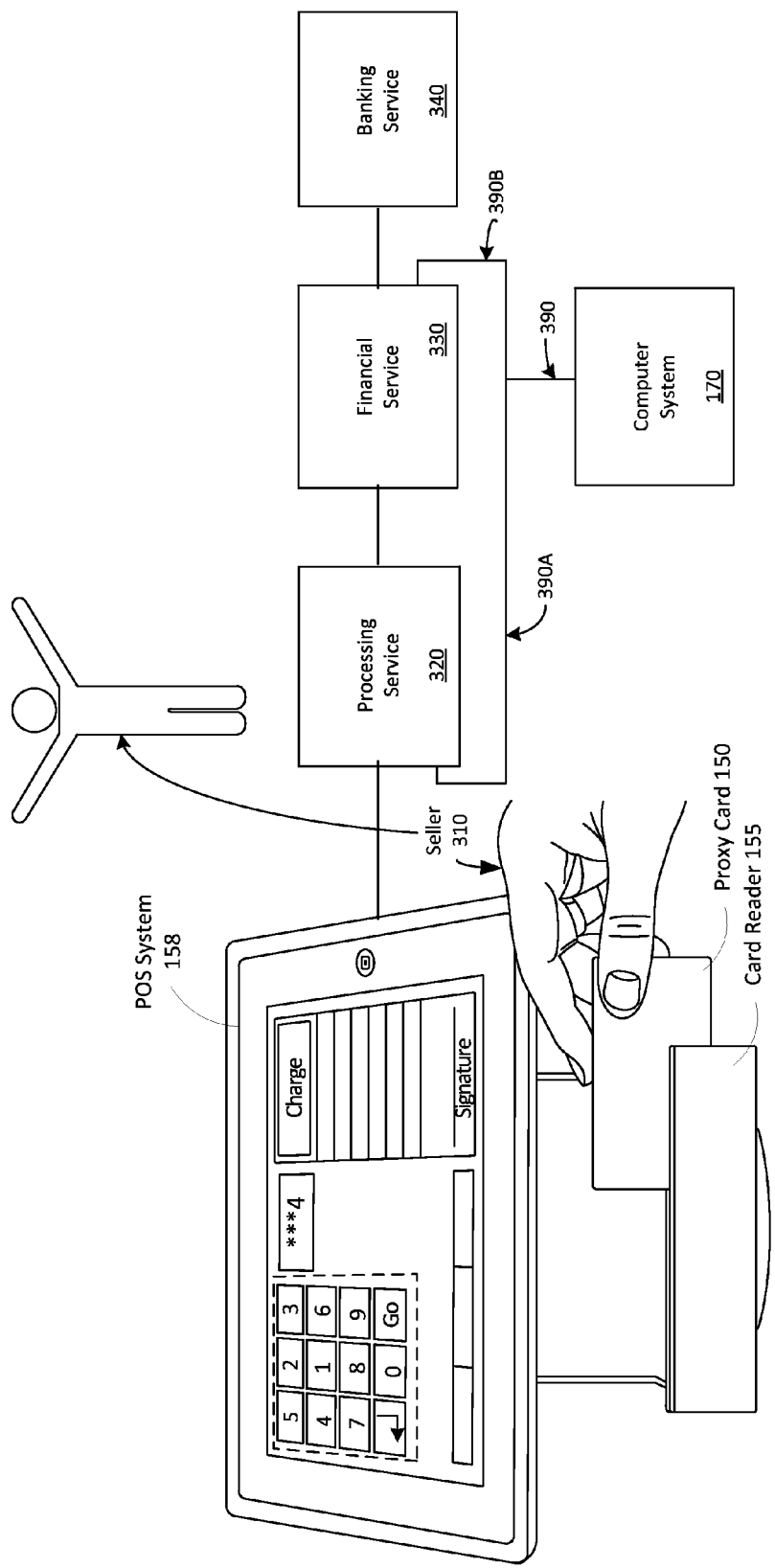
FIG. 3B is an illustration of a second embodiment of a financial system for processing financial transactions and associated fund transfers.

FIG. 3B is an illustration of a second embodiment of a financial system for processing purchase transactions and associated fund transfers. FIG. 3B contains the subset of the components of FIG. 5B that are relevant to explaining the transaction illustrated in FIG. 1. In the embodiment of FIG. 3B, when computer system 170 performs step 120, computer system 170 sends the transaction information and the payment account information to processing service 320 instead of financial service 330. In this embodiment, rather than computer system 170 making the determination to send the transaction and payment account information to financial service 330 for processing, processing service 320 makes this determination. Processing service 320 sends the transaction and payment account information to financial service 330 based on a determination that the selected payment account is a VISA branded payment account, and based on a determination that financial service 330 is the financial service that processes payments made using VISA branded payment cards. In this embodiment, label 390A represents a flow of information that is generally from computer system 170 to processing service 320, such as occurs at steps 120 and 175.

Returning to the description of FIG. 3A, at this point, assuming that the purchase transaction was authorized and the consumer accepted the purchase transaction, the purchase transaction is complete. At a later time, for example when the consumer arrives at home, the consumer can optionally start phase 3, change of payment account 145. If the consumer utilizes change of payment account 145, at step 175 computer system 170 sends the second payment account information and the transaction information to financial system 160.

For the embodiment represented in FIG. 3A, and similar to the above FIG. 3A discussion related to step 120, sending the transaction and payment account information to financial system 160 includes sending the transaction and payment account information to financial service 330, as is represented by 390A of FIG. 3A. For the embodiment represented in FIG. 3B, and similar to the above FIG. 3B discussion related to step 120, sending the transaction and payment account information to financial system 160 includes sending the transaction and payment account information to processing service 320, as is represented by 390A of FIG. 3B. Processing service 320 makes a determination to send the transaction and payment account information to financial service 330.

Returning to the description of FIG. 3A, financial service 330 determines that the payment account of this example is managed by banking service 340, and sends the transaction and payment account information to banking service 340. For other payment accounts, financial service 330 may determine that a different bank manages that payment account. Financial service 330 can send the transaction and payment account information to another banking service, as is represented in FIG. 5A, which shows information flowing from multiple financial services to multiple banking services. Banking service 340 determines the result of payment authorization 130, and sends the result to computer system 170. Upon receipt of the authorization, computer system 170 ensures that funds for the payment will not be taken from the payment account initially selected for the payment. This can be done, for example, by canceling the previously authorized payment. As a result of change of payment account 145, funds for the payment will be transferred from the second payment account to the account associated with the seller, and funds for the payment will not be taken from the initial payment account.

In the financial system embodiment of FIG. 3B, causing the transfer includes computer system 170 sending the transaction and payment account information to processing service 320, as is represented by 390A of FIG. 3B. As discussed previously, processing service 320 determines to send the transaction and payment account information to financial service 330. Financial service 330 performs from this point as previously described.

FIG. 5A is an illustration of a sixth embodiment of a financial system for processing financial transactions and associated fund transfers. Computer system 170 includes financial transaction platform 575. A financial transaction platform enables multiple consumers to engage in financial transactions with multiple payees. As an example of one such financial transaction, a consumer can purchase a coffee from a merchant using payment card 505. POS system 158A can obtain payment card information from payment card 505 and can send the payment card information and the transaction information to financial transaction platform 575.

Financial transaction platform 575 can process the payment made using the payment card, where the processing includes sending information to financial system 160 to causes a transfer of funds from the account associated with payment card 505 to an account associated with the merchant. All other components of FIG. 5A are discussed in the descriptions of FIGS. 1-4. POS systems 158A, B and C are similar to POS system 158. Card readers 155A, B, and C are similar to card reader 155.

FIG. 5B is an illustration of a seventh embodiment of a financial system for processing financial transactions and associated fund transfers. All components of FIG. 5B are discussed in the descriptions of FIGS. 1-5A.

Figure 6A:
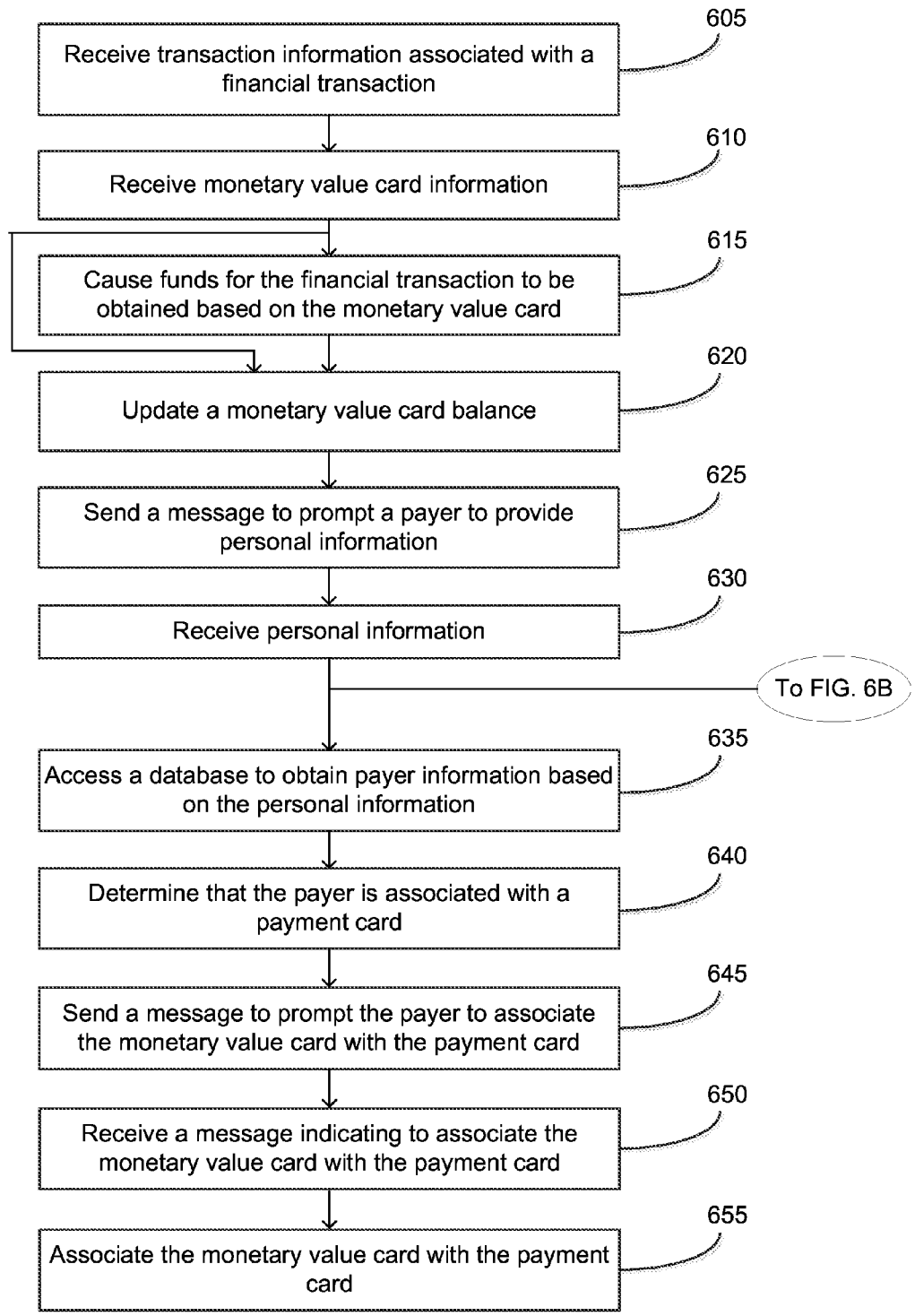
FIGS. 6A and 6B are a flow chart illustrating operations of a method for associating a monetary value card with a payment card.
Figure 6B:
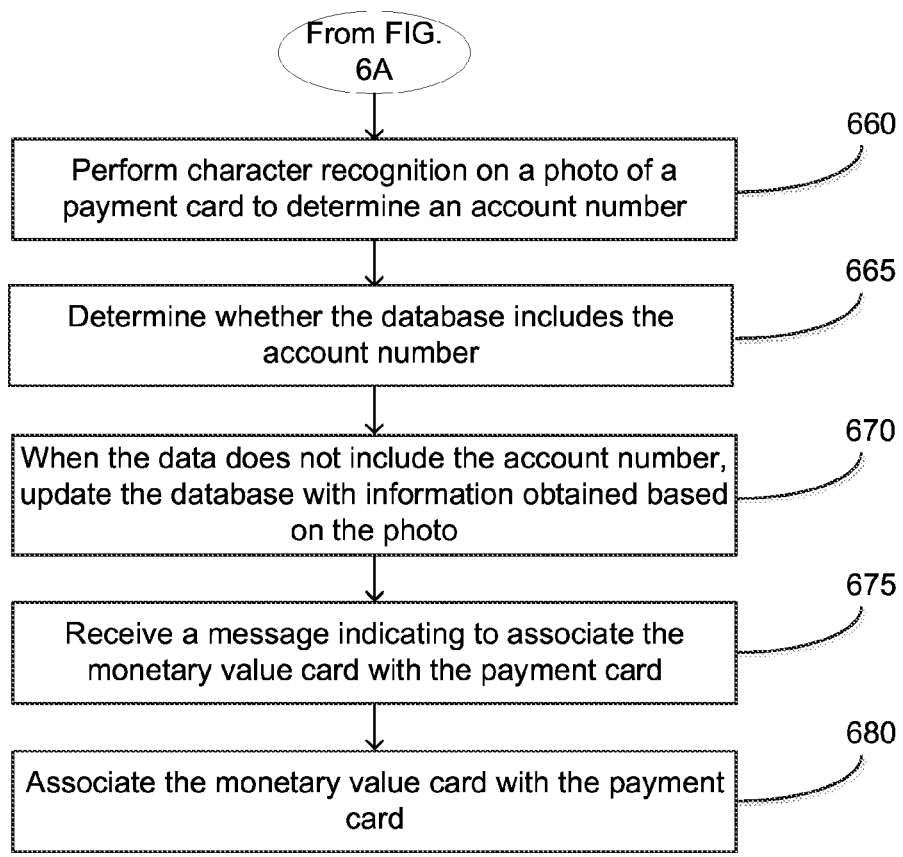
Figure 6B:
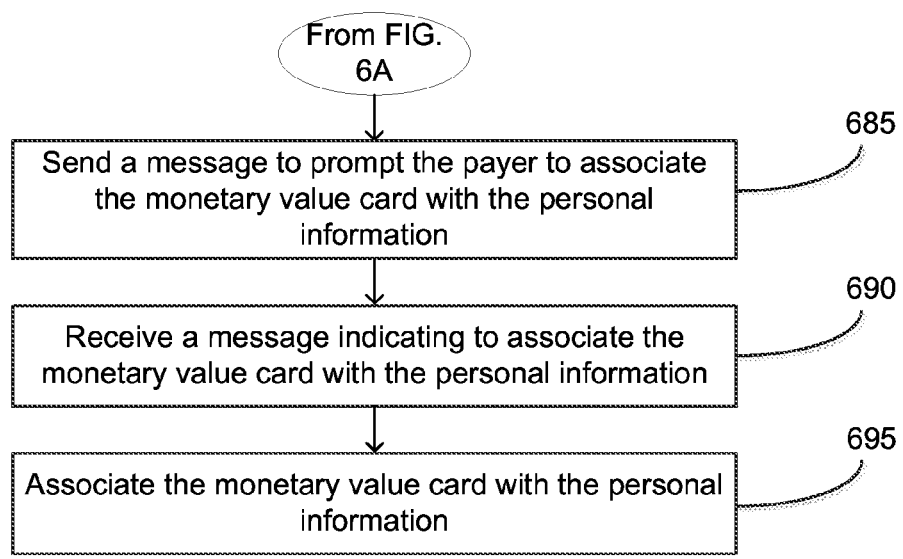

FIGS. 6A and 6B are a flow chart illustrating operations of a method for associating a monetary value card with a payment card. In the example of FIG. 6, a consumer initiates a payment for a financial transaction using a monetary value card, such as a gift card that was purchased as a gift for the consumer by a friend of the consumer. The financial transaction can be, for example, a purchase by a consumer of a cup of coffee from a merchant for an amount of funds. The consumer orders the coffee from the merchant, and the merchant rings up the order using a POS system, such as POS system 158A of FIG. 5A. The consumer presents the gift card to initiate a payment for the coffee. An object identifier, such as card reader 155A that is associated with POS system 158A, obtains gift card information from the gift card. POS system 158A sends transaction information, such as the cost of the purchase, to computer system 170, where the transaction information is received (step 605). Computer system 170 can be a payment service system. POS system 158A also sends the gift card information to computer system 170, where the gift card information is received (step 610).

A particular monetary value card can either be used at a plurality of different merchants, and is referred to herein as a "multi-merchant monetary value card", or can be used at only a particular merchant, and is referred to herein as a "single merchant monetary value card". A particular monetary value card can be either a multi-merchant monetary value card or a single merchant monetary value card, but cannot be both.

A monetary value card is associated with a monetary balance (i.e., a "monetary value card balance"). A "trust fund monetary value card" is associated with a monetary balance that represents money that is held in trust for the consumer by a party. A "faux money monetary value card" is associated with a monetary balance that represents an amount of a financial transaction, such as a purchase of merchandise/services/rentals/etc., that the consumer can complete at a single particular merchant (e.g., the single merchant) based on the card, and does not represent an amount of funds that is held in trust for the consumer. A particular monetary value card can be either a trust fund monetary value card or a faux money monetary value card, but cannot be both.

A particular monetary value card can be one of a faux money monetary value card that is also a single merchant monetary value card, a trust fund monetary value card that is also a single merchant monetary value card, or a trust fund monetary value card that is also a multi-merchant monetary value card.

In some embodiments, such as when the monetary value card is a trust fund monetary value card, computer system 170 causes funds for the financial transaction to be obtained based on the monetary value card, e.g., the gift card (step 615). In these embodiments, funds for the monetary value card are maintained at a financial institution, such as a banking service 340. Computer system 170 can send the transaction information and the monetary value card information, e.g., the gift card information, to financial system 160 to cause funds for the financial transaction to be obtained based on the monetary value card (step 615). The funds can be obtained, for example, by sending information to financial system 160 to cause a transfer of funds from a financial account associated with the monetary value card to a financial account associated with the merchant. The financial account associated with the merchant can be, for example, at a bank.

In some embodiments, such as when the monetary value card is a trust fund monetary value card as well as a single merchant monetary value card, rather than transferring funds between financial accounts, the particular merchant can transfer money between the consumer and the merchant by updating financial account balances associated with the financial account of the merchant.

For example, a friend of a consumer pays a merchant twenty dollars for a gift card (ignoring various possible fees associated with the gift card). The merchant deposits the twenty dollars into a financial account of the merchant, where the merchant holds the twenty dollars in trust for the possessor of the gift card. The financial account also holds funds of the merchant (i.e., funds that are not held in trust for others, but rather that the merchant can freely spend). The balances of the various gift card financial accounts that the merchant holds in trust for others, and the balance of the merchants funds, are maintained by the merchant.

The friend of the consumer gives the gift card to the consumer, who uses the gift card to make a purchase. Being a gift card that is only valid at the particular merchant, the consumer makes the purchase at the merchant. The purchase is for goods totaling fifteen dollars. In order to cause a transfer of funds for the financial transaction based on the gift card, the merchant simply decreases the balance of funds of the gift card account by fifteen dollars, from twenty dollars to five dollars (ignoring various possible fees, such as transaction fees). The merchant also increases the merchant account balance by fifteen dollars (once again, ignoring various possible fees). The total amount of funds in the financial account of the merchant is unchanged. It is just the balance of the funds of the gift card account and the balance of the funds of the merchant account that change via updated accounting of these account balances.

In some embodiments where the monetary value card is a trust fund monetary value card as well as a single merchant monetary value card, computer system 170 causes funds for the financial transaction to be obtained based on the monetary value card (step 615) by updating an amount of funds that are available at the gift card financial account, and by updating an amount of funds that are freely available to the merchant (e.g., funds that are "owned" by the merchant and are not held in trust for others).

In some embodiments, such as when the monetary value card is a stored value card, computer system 170 causes funds for the financial transaction to be obtained based on the stored value card (step 615) by transferring funds from the stored value card to a financial account of the merchant.

In some embodiments, such as when the monetary value card is a faux money monetary value card, step 615 is not executed. In these embodiments, no funds are obtained by the merchant for the financial transaction based on the financial transaction. In these embodiments, the monetary value card balance is updated, such as at step 620, to reflect the remaining amount of goods/services/rentals/etc. that the consumer can purchase after completion of the financial transaction. For example, the monetary value card balance can be reduced by an amount that corresponds to the amount of the financial transaction, such as by the amount of the financial transaction or by the amount of the financial transaction plus associated transaction fees.

Computer system 170 updates a monetary value card balance (step 620) to reflect an amount of funds available based on the monetary value card, or to reflect an amount of goods/services/rentals/etc. that can be purchase from the merchant. In a first example where a monetary value card is a trust fund monetary value card, the monetary value card has a total amount of funds available of twenty dollars. A financial transaction involves a payment by the consumer of fifteen dollars, which will be paid based on the monetary value card. The updated monetary value card balance, based on using the monetary value card to pay for the financial transaction, is five dollars (assuming that there are no transaction fees associated with use of the monetary value card for the financial transaction).

In a second example where the monetary value card is a faux money monetary value card, the monetary value card has an associated monetary value card balance that indicates that the possessor of the monetary value card can purchase twenty dollars of goods/services/rentals/etc. at the particular merchant. A financial transaction involves a payment by the consumer of fifteen dollars, which will be accommodated via the monetary value card. The updated monetary value card balance, based on using the monetary value card for the financial transaction, is five dollars (assuming that there are no transaction fees associated with use of the monetary value card for the financial transaction).

Computer system 170 sends a message to POS system 158A to prompt the consumer to provide personal information (step 625). The message can cause POS system 158A to display an inquiry message that prompts the consumer to provide personal information of the customer. The inquiry message can be or include, for example: an inquiry as to whether the consumer would like to receive a digital receipt for the financial transaction; an inquiry as to whether the consumer has an account/profile, such as with financial transaction platform 575, with a company that is associated with computer system 170, etc.; an inquiry as to whether the consumer would like to link his monetary value card with a payment card; an inquiry as to whether the consumer would like to purchase an extended warranty for an item that is part of a financial transaction; a request to send a photo of the payment card if he would like to link the two cards, etc. The inquiry can include a request for personal information of the consumer, such as one or more of an email address, an Internet Protocol (IP) address, a phone number, etc., associated with the consumer, and to which further communications regarding the inquiry can be directed. The personal information can also include a photo of a payment card in the possession of the consumer, and to which he would like to link his monetary value card.

The consumer can indicate an affirmative response to the inquiry request by, for example, inputting his personal information at or via POS system 158A, by tapping an icon at POS system 158A that indicates an affirmative response, etc. Inputting his personal information at POS system 158A can include taking a photo of a payment card with which he wishes to associate the monetary value card with POS system 158A, or sending a photo that he takes with his mobile device to POS system 158A, such as via Bluetooth or a wireless network. When the affirmative response is not associated with an inputting of the personal information, POS system 158A can prompt the consumer to input his personal information. Upon receipt of the personal information, POS system 158A can send the personal information to computer system 170, where the personal information is received (step 630).

In some embodiments, computer system 170 can access stored association information, such as association information that is stored in a database, based on the personal information (step 635) to determine whether the consumer is associated with a payment card via the database (step 640). For example, the consumer may have an account/profile at computer system 170 and/or financial transaction platform 575, may have an account/profile with a company that is associated with computer system 170, etc. Information associated with the account/profile, such as the personal information or card information for a payment card of the consumer, can be stored with the stored association information. When the account/profile of the consumer includes personal information for the consumer, computer system 170 can determine that the personal information that was provided by the consumer is associated with the account/profile. The account/profile information can further contain card information for a payment card that is associated with the consumer.

When computer system 170 determines that the consumer is associated with a payment card, computer system 170 can send a message to POS system 158A, or to any destination that is associated with the consumer via the stored association information, to prompt the consumer to associate the monetary value card with the payment card (step 645). Destinations that can be associated with the consumer via the stored association information include a computing device, such as the consumer's mobile device, an email address, a phone number, etc. The message can be, for example: an email sent to the email address; a text message sent to the phone number or the mobile device, such as via short message service (SMS) or multimedia messaging service (MMS); a message sent to an IP address of the computing device or the mobile device; etc.

The message can prompt the consumer to associate the monetary value card with the payment card in any of various ways. For example, the message: can cause POS system 158A to display a message asking whether the consumer would like to associate the monetary value card with the payment card; can cause a mobile device that is associated with the consumer, such as via the stored association information, to display a message asking whether the consumer would like to associate the monetary value card with the payment card; can be an email sent to the email address associated with the consumer, such as via the stored association information, asking whether the consumer would like to associate the monetary value card with the payment card; can be a text message sent to a mobile device or phone number associated with the consumer, such as via the stored association information, asking whether the consumer would like to associate the monetary value card with the payment card; etc.

Based on receiving an indication to associate the monetary value card with the payment card (step 650), computer system 170 can update the stored association information to reflect an association between the monetary value card and the payment card (step 655). If computer system 170 does not receive an indication to associate the monetary value card with the payment card (e.g., where the consumer does not wish to create such an association), no association is created between the monetary value card and the payment card.

In some embodiments, the monetary value card is associated/linked with the payment card in other ways. For example, in some embodiments, the consumer can take a photo of the monetary value card and of the payment card using his mobile device. The consumer can send the photos to computer system 170, or to an application running at the mobile device, either of which can obtain, based on an analysis of the photos, the card information needed to link the cards. When the cards are linked via the application, the application can send a message to computer system 170 to cause computer system 170 to update, based on the message, the stored association information to reflect an association between the monetary value card and the payment card. As a second example, the consumer can swipe the two cards through a card reader connected to a mobile device of the consumer, and can send, via the mobile device, the data obtained by the card reader to computer system 170.

As a third example, the consumer can login to a website that is associated with computer system 170, and can enter card information obtained from the monetary value card. When the payment card information is available to the website, such as via a account/profile of the consumer at the website, the website can cause computer system 170 to update the stored association information to reflect an association between the monetary value card and the payment card. When the payment card information is not available to the website, the card information from the payment card can be entered at the website. The website can send a message to computer system 170 to cause computer system 170 to update the stored association information to reflect an association between the monetary value card and the payment card based on the card information from the monetary value card and/or the payment card.

When the personal information of step 630 includes a photo of a payment card of the consumer, instead of performing steps 635-645, steps 660-670 can be performed. When the personal information includes a photo of a payment card with which the consumer wishes to link his monetary value card, computer system 170 can perform character recognition on the photo to determine an account number and other information that is visible on the card (step 660). Based on the account number, computer system 170 can access the database to determine whether the database includes the account number (step 665).

When the database does not include the account number, computer system 170 updates the database with information obtained based on the photo, such as based on the character recognition of the photo (step 670). Based on receiving the photo, which is an indication to associate the monetary value card with the payment card (step 675), computer system 170 can update the stored association information to reflect an association between the monetary value card and the payment card (step 680). Steps 675 and 680 are, respectively, substantially similar to steps 650 and 655.

In some embodiments, in addition to, or as an alternative to, steps 635-655 or steps 660-680, computer system 170 can perform some or all of steps 685-695. Computer system 170 can send a message to prompt the payer to associate the monetary value card with the personal information (step 685), and can receive a message indicating to associate the monetary value card with the personal information (step 690). Steps 685 and 690 are, respectively, substantially similar to steps 645 and 650, except that the monetary value card is to be associated with the personal information rather than the payment card.

In some embodiments, based on the message of step 690, computer system 170 updates the database to associate the monetary value card with the personal information (step 695). In some embodiments, steps 685 and 690 are skipped, and step 695 is performed based on step 630. Step 695 is substantially similar to step 655, except that the monetary value card is being associated with the personal information rather than the payment card.

Figure 7:
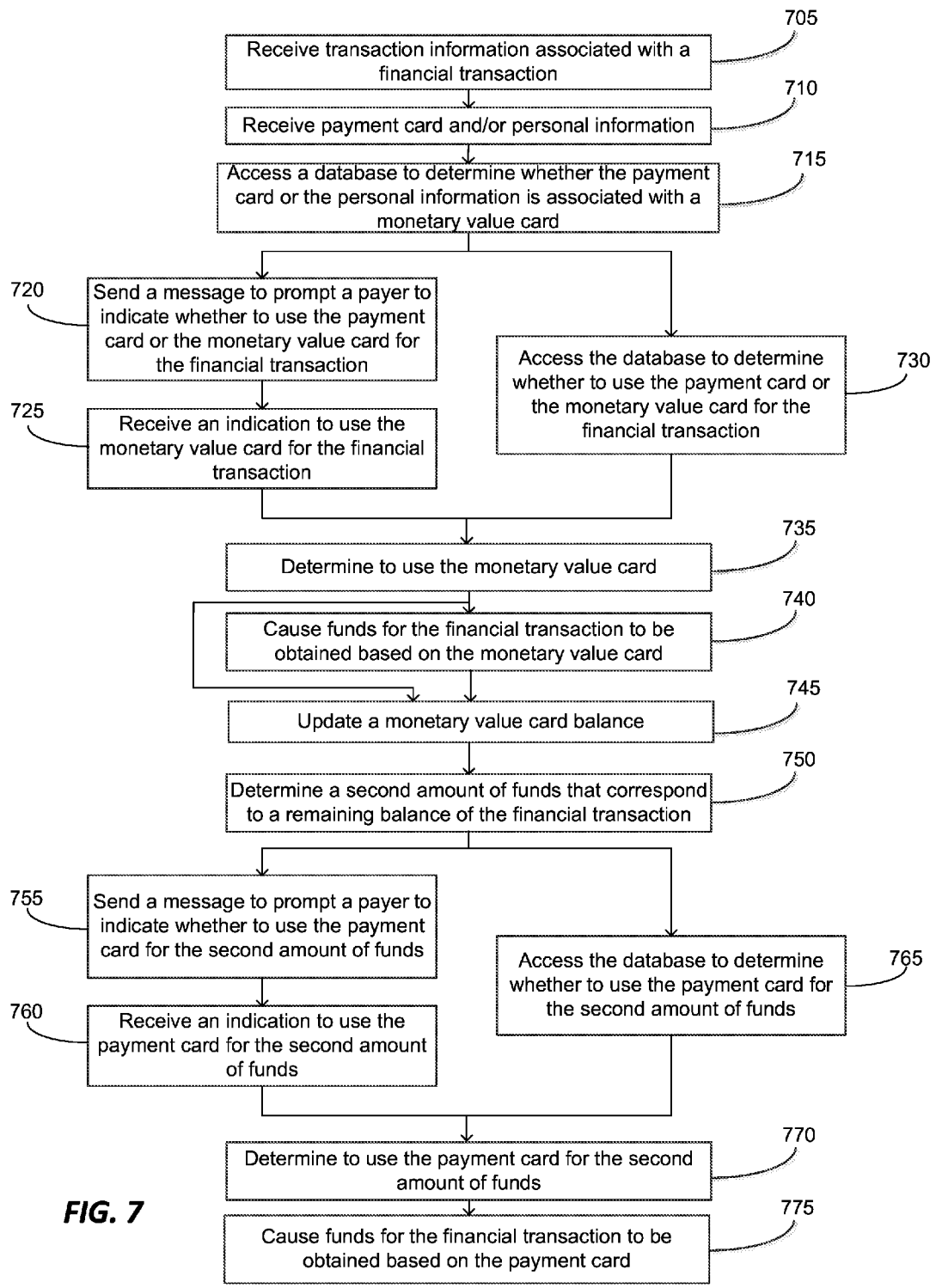
FIG. 7 is a flow chart illustrating operations of a method for making a payment based on a monetary value card that is associated with a payment card.

FIG. 7 is a flow chart illustrating operations of a method for making a payment based on a monetary value card that is associated with a payment card. In the example of FIG. 7, a payer, e.g., a consumer, initiates a payment for a financial transaction using a payment card, such as a credit card, a charge card, an ATM card, or a debit card, or initiates the payment by providing personal information, such as a phone number or email address. The financial transaction can be, for example, a purchase by a consumer of a coffee from a merchant for an amount of funds.

The consumer orders the coffee from the merchant, and the merchant rings up the order using a POS system, such as POS system 158A of FIG. 5A. In some embodiments, the consumer presents the payment card to initiate a payment for the coffee. An object identifier, such as card reader 155A that is associated with POS system 158A, obtains payment card information from the payment card. In some embodiments, the consumer provides personal information, such as by entering a phone number or email address using POS system 158A. POS system 158A sends transaction information, such as the cost of the purchase, to computer system 170, where the transaction information is received (step 705). POS system 158A also sends the payment card information, and/or the personal information, to computer system 170, where the payment card and/or personal information is received (step 710).

Computer system 170 accesses a database to determine whether the payment card and/or the personal information is associated with a monetary value card (step 715). The database contains association information that represents an association between the payment card and a monetary value card, and/or that represents an association between the personal information and the monetary value card. In other embodiments, computer system 170 can access other computer based storage mechanisms to determine whether the payment card and/or the personal information is associated with a monetary value card. The other computer based storage mechanisms, such as a file, a spreadsheet, etc., can also contain association information that represents an association between the payment card and the monetary value card, and/or that represents an association between the personal information and the monetary value card.

In some embodiments, computer system 170 sends a message to prompt the consumer to indicate whether to use the payment card or the monetary value card for the financial transaction (step 720). In various embodiments, computer system 170 can send the message to POS system 158A or a mobile device of the consumer, where the message causes POS system 158A or the mobile device to display a message inquiring whether the consumer wants to use the monetary value card or the payment card for the financial transaction. When the monetary value card is associated with personal information, the message of step 720 can inquire whether the consumer wants to use the monetary value card for the financial transaction. The payer indicates his response, such as by touching an icon on POS system 158A or the mobile device, that indicates to use the monetary value card. POS system 158A or the mobile device send a message to computer system 170 that indicates to use the monetary value card for the financial transaction, where the message is received (step 725).

In some embodiments, rather than performing steps 720 and 725, computer system 170 accesses the database to determine whether to use the payment card or the monetary value card for the financial transaction (step 730). For example, the payer can access a website associated with computer system 170, or can access an application running on his mobile device that can communicate with computer system 170. Using the website or the application, the user can access a profile or other account-related mechanism associated with computer system 170, such as a profile or a personal payment processing policy at financial transaction platform 575. Via the profile, the personal payment processing policy, etc., the payer can indicate that any electronic payments that are initiated with his payment card or with his personal information are to be paid for using a monetary value card associated with the payment card or the personal information whenever possible.

Computer system 170, based on the indication of step 725 or the database access of step 730, determines to use the monetary value card for the financial transaction (step 735). The determination of step 735 can additionally be based on further verification of identity of the consumer, such as when step 710 includes receiving personal information and not payment card information. For example, computer system 170 can perform two factor identity verification, such as by sending a text message to a phone number of the consumer and/or by sending an email to an email address of the consumer, and by verifying the identity of the consumer based on a response to the text message or email. The text message and/or email address can be obtained based on the personal information, or based on data associated with the consumer via the database. As an additional example, the merchant can verify the identity of the payer, such as by checking the payer's driver's license, and can send a message via POS system 158A to computer system 170 to indicate the further identity verification.

In some embodiments, computer system 170 causes funds for the financial transaction to be obtained based on the monetary value card (step 740). Step 740 is similar to step 615 of FIG. 6, and the funds for the financial transaction can be obtained in ways that are similar to those discussed at step 615. Computer system 170 updates a monetary value card balance (step 745) to reflect an amount of funds available based on the monetary value card, or to reflect an amount of goods/services/rentals/etc. that can be purchased from, e.g., the merchant. Step 745 is similar to step 620 of FIG. 6.

In some embodiments, computer system 170 determines a second amount of funds that correspond to a remaining balance of the financial transaction (step 750). Computer system 170 determines a balance of funds that are available via the monetary value card, and determines that the balance of funds is less than the amount of the financial transaction. Computer system 170 determines a second amount that corresponds to a remaining balance for the financial transaction after funds for the second financial transaction are obtained.

For example, a consumer purchases of groceries from a grocer for an amount of $100. The consumer initiates a payment using a payment card, and uses a monetary value card linked to the payment card to pay for the groceries. However, computer system 170 determines that the monetary value card only has $80 of funds available, and that this is less than the amount of the groceries. In this example, there are no transaction fees associated with using the monetary value card. Computer system 170 determines that, after exhausting the funds of the monetary value card to pay for the groceries, the financial transaction will have a remaining balance of $20.

In some embodiments, computer system 170 sends a message to prompt the consumer to indicate whether to use the payment card for the second amount of funds (step 755). In various embodiments, computer system 170 can send the message to POS system 158A or a mobile device of the consumer, where the message causes POS system 158A or the mobile device to display a message asking whether the consumer wants to use the payment card for the second amount of funds. The payer indicates his response, such as by touching an icon on POS system 158A or the mobile device, that indicates whether to use the payment card. POS system 158A or the mobile device send a message to computer system 170 that indicates whether to use the payment card for the second amount of funds, where the message is received (step 760).

In some embodiments, rather than performing steps 755 and 760, computer system 170 accesses the database to determine whether to use the payment card for the second amount of funds (step 765). Using methods similar to step 730, the consumer can indicate to use the payment card to pay a remaining balance for a financial transaction whenever the monetary value card does not have sufficient funds to fully pay for the financial transaction.

Computer system 170 determines, based on the indication of step 760 or the database access of step 765, to use the payment card for the second amount of funds (step 770). Computer system 170 causes funds for the financial transaction to be obtained based on the payment card (step 775). Computer system 170 sends the transaction information to a financial system, such as financial system 160 of FIG. 5A. However, rather than sending the amount of the financial transaction with the transaction information, computer system 170 sends the second amount of funds (i.e., the remaining balance of the financial transaction). Computer system 170 also sends the payment card information.

Financial system 160 authorizes a payment based on the payment card information, and sends a payment authorization to computer system 170. Financial system 160 processes a payment for the second amount of funds based on a financial account that is associated with the payment card. For example, when the payment card is a debit card or an ATM card, financial system 160 causes a financial account associated with the payment card to be debited by a third amount that corresponds to the second amount of funds, and causes a financial account associated with the merchant to be credited by a fourth amount that corresponds to the second amount of funds. When there are no transaction fees associated with using the payment card, the second amount, the third amount, and the fourth amount are all the same amount of funds. When there is a transaction fee or fees associated with using the card, the third amount and/or the fourth amount can differ from the second amount by a portion or all of the transaction fee(s).

As a second example, when the payment card is a credit card or a charge card, financial system 160 causes a credit balance of a financial account associated with the payment card to be increased by a fifth amount that corresponds to the second amount of funds, and causes a financial account associated with the merchant to be credited by a sixth amount that corresponds to the second amount of funds. When there are no transaction fees associated with using the payment card, the second amount, the fifth amount, and the sixth amount are all the same amount of funds. When there is a transaction fee or fees associated with using the card, the fifth amount and/or the sixth amount can differ from the second amount by a portion or all of the transaction fee(s).

Figure 8:
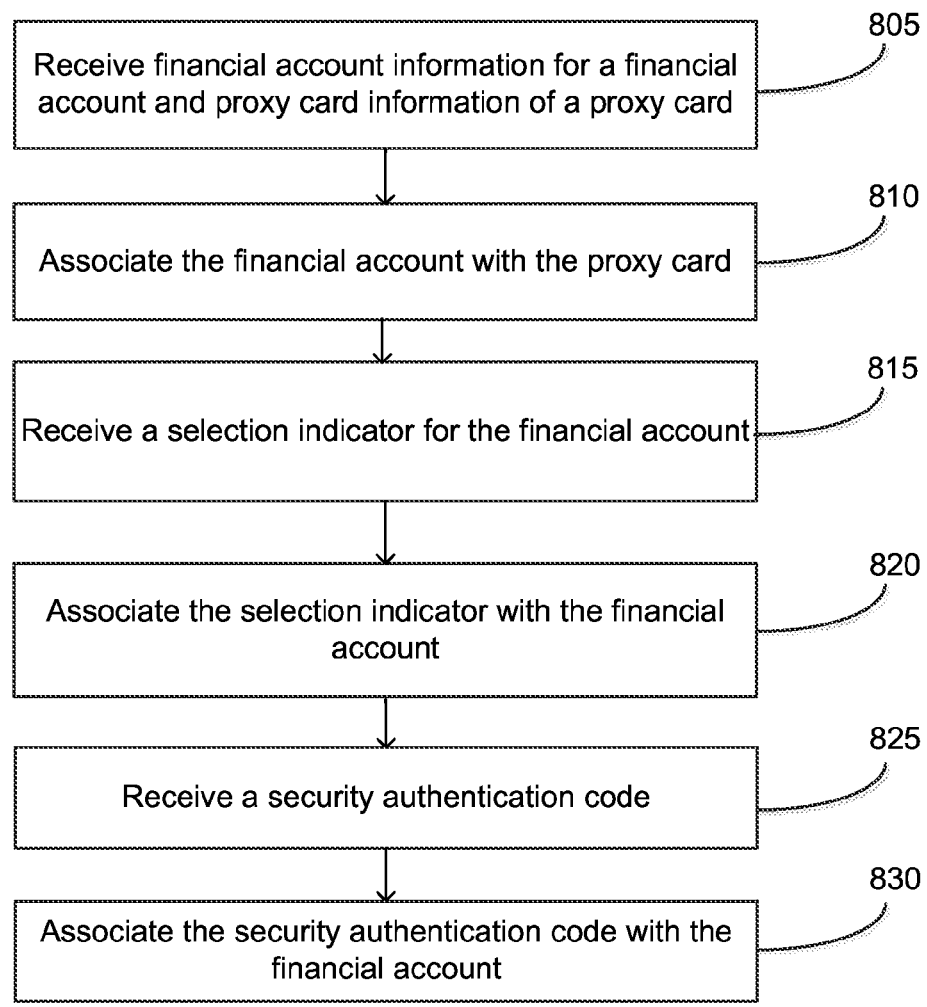
FIG. 8 is a flow chart illustrating operations of a method for associating a selection indicator with a financial account.

FIG. 8 is a flow chart illustrating operations of a method for associating a selection indicator with a financial account. In an illustrative use case, a proxy card, manufactured to be compatible with a debit processing network, is issued in the name of the consumer. When the responsible party is an entity, such as a company, the card is issued in the name of the entity, or in the name of an agent of the entity. A debit processing network is a network for processing electronic payments initiated by debit cards, examples of which include Pulse, Star, SHAZAM, etc. At the time of issue, the proxy card of this example is not linked to any financial accounts. In some embodiments, the proxy card is a debit card that is issued by a bank in the name of the responsible person or entity, or an agent of the entity, and that is linked to a financial account of the person or entity at the time of issue. In this example use case, the proxy card is not linked to any financial account of the consumer at the time of issue.

After receipt of the proxy card (or the debit card when proxy card is a debit card), the consumer links/associates the proxy card with one or more financial accounts. The linking can happen in any of multiple ways. For example, the consumer can login to a website associated with a payment processing system, can launch an application that is associated with the payment processing system on his mobile phone, etc. The consumer can input proxy card information, which is information obtained from the proxy card, to the website or application. The consumer can further input account information for the financial accounts that he wishes to have linked with the proxy card. For the application, the consumer can input the proxy card or the account information in various additional ways, such as by scanning the proxy card or a payment card associated with the financial account with a card reader that is coupled to his mobile device or to a POS system, by taking a photo of the proxy card or the payment card associated with the financial account so the application or payment processing system can analyze the photo to obtain the proxy card and/or account information, etc. Card information from a payment card can be account information for an associated financial account.

For example, when a financial account to be linked is a checking account, the account information can be debit card information from a debit card associated with the checking account. When the financial account is a credit account associated with a credit card, the account information can be credit card information from the credit card. When the financial account is an online payment account, the account information can be the account login identity.

The website or application send the financial account information, for each financial account that the payment processing system is to link with the proxy card, and the proxy card information to the payment processing system, where the information is received (step 805). The payment processing system associates, such as via a database, the financial accounts with the proxy card (step 810). A message sent by an application is inherently also sent by the mobile device on which the application is executing.

To enable the consumer to indicate a financial account to use for a payment via a POS system, the consumer assigns a selection indicator to one or more of the financial accounts. The selection indicator enables the consumer to identify, via a POS system, one or more of the financial accounts associated with the proxy card to use for a payment initiated based on a swipe of the proxy card at the POS system. The selection indicator can be any of various indicators.

As a first example, the selection indicator can be a selection indicator PIN. The selection indicator PIN is text string that in various embodiments is a numeric string, an alphanumeric string, etc., and that is compatible with the system(s) that will process the selection indicator PIN, such as a POS system and a debit processing network. Another type of PIN, which is sometimes referred to in this application as a "security PIN", has a different purpose and is distinguishable from a selection indicator PIN. A security PIN is a security authentication code that is required for security purposes to process an electronic payment for a financial account, such as a PIN for authorizing a debit card transaction. The consumer can indicate selection indictor PINs for one or more of the financial accounts, for example by inputting the selection indicator PINs via the website or application, and can indicate the associated financial account for each selection indicator PIN. The payment processing system can determine to select, based on the selection indicator PIN, one of the financial accounts linked with the proxy card.

As a second example, the selection indicator can be a card type. For example, a consumer has a proxy card that is manufactured to be compatible with a debit card processing system. When the consumer swipes the proxy card at a POS system, he can indicate to process the debit card as a credit type card (i.e., a credit transaction) or a debit type card (i.e., a debit transaction), such as by touching either a first button to indicate a credit transaction or a second button to indicate a debit transaction. The consumer can provide a selection indicator to the website/application that indicates to use a first account of the financial accounts associated with the proxy card when the card type is credit, and to use a second financial account when the card type is debit. As another example, the consumer can provide a selection indicator to the website/application that indicates to use a first account when the card type indicated by the consumer using the POS system matches the card type of the proxy card, and that indicates to use a second account when the indicated card type does not match the card type of the proxy card. For example, the consumer can indicate that the proxy card is an EBT type card, when, in fact, the proxy card is a debit type card. In this case, the indicated card type does not match the card type of the proxy card, so the second account would be used for this payment.

As a third example, the selection indicator can be a tip amount. For example, the consumer presents his proxy card to use for a meal. The payment is processed as a credit transaction, and a receipt is provided to the consumer. The receipt includes an area to indicate a tip amount. The consumer can provide a selection indicator to the website/application that indicates to use a first account of the financial accounts associated with the proxy card when the tip ends in, for example, and even number, and to use a second account when the tip ends in an odd number. As another example, a first account can be used when the tip is below five percent, a second account can be used when the tip is between five and ten percent, and a third account can be used when the tip is above ten percent. As is apparent, there are a number of different schemes that can be used to indicate a financial account to use based on the tip amount.

As a fourth example, the selection indicator can be a cash back amount. For example, the consumer presents his proxy card to pay for groceries at a store, and processes the payment as a debit transaction and requests a cash back amount. The consumer can provide a selection indicator to the website/application that indicates to use a first account of the financial accounts associated with the proxy card when the cash back amount is a first amount, to use a second account when the cash back amount is a second amount, etc. As another example, a first account can be used when the cash back amount ends in an even number, and a second account can be used when the cash back amount ends in an odd number. As is apparent, there are a number of different schemes that can be used to indicate a financial account to use based on the cash back amount.

As a fifth example, the selection indicator can be based on signature data. For example, the consumer presents his proxy card to pay for a meal. His waiter processes the payment as a credit transaction using a POS system, and the waiter provides a signature pad that is coupled to the POS system to the consumer to electronically capture his signature to authorize the transaction. The consumer writes his signature on the signature pad, and then writes "VISA card" on the signature pad. The signature data, which includes data representing both his written signature and the "VISA card" that he wrote, is forwarded to a payment processing system, where the signature can be analyzed based on character recognition. Based on the signature data, which states "VISA card", a VISA credit account associated with the proxy card is used for the payment. The consumer can provide a selection indicator to the website/application that indicates an account to use when the signature data indicates a certain combination of alphanumeric character symbols, geometric symbols, punctuation symbols, etc.

As a sixth example, the selection indicator can be based on a biometrically identifiable body part or an orientation of a body part. For example, the consumer presents his proxy card to pay for a purchase. The merchant processes the payment with a POS system, and asks to scan a body part to authorize the transaction. The consumer can provide a selection indicator to the website/application that indicates a first account to use when the body part is a first body part or is a first orientation, and a second account to use when the body part is a second body part or is a second orientation. For example, the consumer can provide a selection indicator that indicates to use a first account when the consumer provides a right thumb print, and to use a second account when the consumer provides a left thumb print.

The consumer can use the website or application to identify one or more of the financial accounts associated with the proxy card, and to input one or more selection indicators for each financial account. The one or more of the financial accounts that are identified and assigned a selection indicator are those that will be enabled for selection to use for a payment via the POS system based on a selection indicator that is indicated via a POS system. The payment processing system can determine to select, based on the selection indicator, one of the financial accounts linked with the proxy card. The website or application sends the selection indicator(s) to the payment processing system, where the selection indicator(s) is(are) received (step 815). The payment processing system associates, such as via the database, each selection indicator with the corresponding financial account (step 820).

In some embodiments, for the financial accounts that require a security authentication code, and that that consumer wants to indicate to use for a payment via a POS system, the consumer provides the code. For example, to process a payment made via a debit card and processed as a debit transaction, and where funds for the payment will be debited from a checking account, a consumer may need to provide a personal identification code (PIC), such as a security PIN. This PIC is a security authentication code. As a second example, to process an online payment made via an online payment processor, the consumer may need to provide a password for the consumer's account at the online payment processor. This password is also a security authorization code.

The consumer indicates the security authentication codes and the associated financial account, for example by entering the security authentication code at the website and indicating the account with which the security authentication code is associated. The website sends the security authentication codes for one or more of the financial accounts to the payment processing system, where the codes are received (step 825). The one or more financial accounts are those financial accounts that the consumer wishes to enable for selection via a POS system, etc. The payment processing system associates, such as via the database, each security authentication code with the corresponding financial account (step 830).

Figure 9:
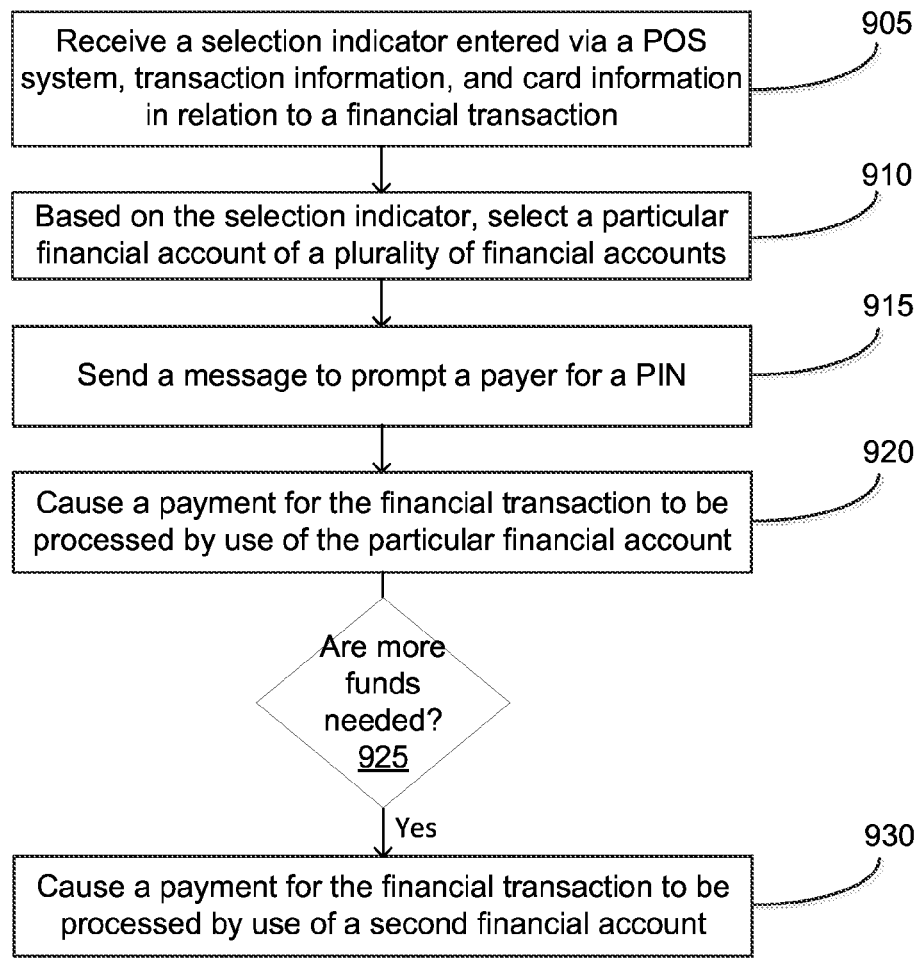
FIG. 9 is a flow chart illustrating operations of a method for selecting a financial account based on a selection indicator entered via a point-of-sale (POS) system.

FIG. 9 is a flow chart illustrating operations of a method for selecting a financial account based on a selection indicator entered via a point-of-sale (POS) system. Continuing with the illustrative use case of FIG. 8, once the various financial accounts, selection indicators, and security authentication codes are linked with the proxy card, the consumer uses the card to make an electronic payment. The consumer visits his local coffee shop, and engages in a financial transaction with a merchant to purchase a cup of coffee. The merchant rings up the purchase with a POS system, which totals a first amount of funds. The consumer swipes his proxy card at a card reader that is coupled with the POS system, and indicates a selection indicator via the POS system. During the swipe, the card reader obtains proxy card information from the proxy card, such as by reading a magnetic stripe of the proxy card.

The selection indicator that the consumer can indicate can be any of the selection indicators discussed in the description of FIG. 8, and can be indicated per the methods discussed in the description of FIG. 8. In this example use case, the selection indicator is a selection indicator PIN. Further, the proxy card of this example is compatible with a debit card processing system. After the consumer swipes the proxy card, the POS system prompts him to indicate whether the electronic payment will be processed via a credit system, or a debit system. The consumer touches a button of the POS system to indicate debit, and the POS system then prompts him to enter a PIN. However, rather than entering a PIN that is a security PIN, the consumer enters a PIN that is a selection indicator PIN by use of the POS system.

The POS system forwards the proxy card information, transaction information, and the PIN to a processing service, such as processing service 320 of FIG. 5A. The debit card of this example is a VISA Debit branded debit card, so processing service 320 forwards the proxy card information, transaction information, and the PIN to a financial service, such as financial service 330. In this example, financial service 330 is a debit processing network that processes VISA Debit transactions, the Plus or Interlink debit processing networks. The proxy card of this example includes meta-data that enables financial service 330 to forward the proxy card information, transaction information, and the PIN to a payment processing system, such as computer system 170 of FIG. 5A, where the information is received (step 905). In some embodiments, computer system 170 can be under the control of financial service 330, similar to the illustration of FIG. 4B. In these embodiments, the proxy card does not need meta-data, as any data that is forwarded to financial service 330 is received by computer system 170.

Computer system 170, based on the proxy card information, accesses a database containing association information and determines that the proxy card is associated with multiple financial accounts. Computer system 170 further determines that one or more of the multiple financial accounts have selection indicator PINs associated with them. Based on the PIN received at step 905, which computer system 170 has determined, based on the database access, that the PIN is a selection indicator PIN. Based on the selection indicator PIN, computer system 170 accesses the database to determine the financial account that corresponds to the selection indicator PIN, and selects that financial account to use to pay for the coffee (step 910). In this example, the selected financial account is a checking account that is associated with a debit card.

For financial accounts that require a security authentication code to process an electronic payment based on the account, the security authentication code can be obtained in various ways. For example, when the financial account is associated with a security authentication code, such as a security authentication code associated with a financial account at step 830 of FIG. 8, computer system 170 can access a database to obtain the security authentication code. As another example, when the financial account is not associated with a security authentication code, computer system 170 can access the database to determine a mobile device that is associated with the consumer. Computer system 170, based on association data stored in the database, sends a message to the mobile device to prompt the consumer to enter the security authentication code for the selected financial account (step 915). In this example, the security authentication code is the security PIN for the debit card associated with the checking account. In another example, the security authentication code is a password for an online payment account.

Computer system 170 sends a message to a financial system, such as financial system 160 of FIG. 5A, to cause a payment for the financial transaction to be processed by use of the selected financial account (step 920). The message can include account information for the selected financial account, which computer system 170 obtains from the database. The message can cause funds for the payment to be processed, for example, by being debited from the selected financial account, and credited to a financial account associated with the merchant. The payment may involve one or more transaction fees, so the amount debited from the consumer's account may differ from the amount credited to the merchant's account by the total of the one or more transaction fees.

For example, a bank may charge a first transaction fee from the consumers financial account, and a payment processor may charge a second transaction fee. When the financial transaction involves one payment from an account that has adequate funds for the payment, the amount debited from the consumer's financial account can be the total of the purchase (i.e., the first amount) plus the first transaction fee. The amount credited to the merchant's account can be the first amount less the second transaction fee. When there are no transaction fees, the amount debited from the consumer's account is the first amount, and equals the amount credited to the merchant's account.

In some cases, the selected financial account may not have funds adequate to pay the purchase total (i.e., the first amount of funds). In some embodiments, computer system 170 determines whether more funds are needed (step 925). When more funds are needed, computer system 170 can cause an additional payment for the financial transaction to be processed by use of a second financial account that is associated with the proxy card (step 930). In some embodiments, the consumer indicates a second selection indicator via the POS system.

For example, the second indicator can be a tip amount, a card type, etc., that is entered via the POS system. Computer system 170 can select a first financial account to make a payment for the financial transaction based on the selection indicator PIN, and can select a second account for an additional payment for the financial transaction based on a tip amount selection indicator that is associated with the financial account via the database. In some embodiments, the second account is selected based on a default setting. For example, the consumer can indicate a default financial account to use for financial transactions, and the additional payment can be based on the default account.

Figure 10:
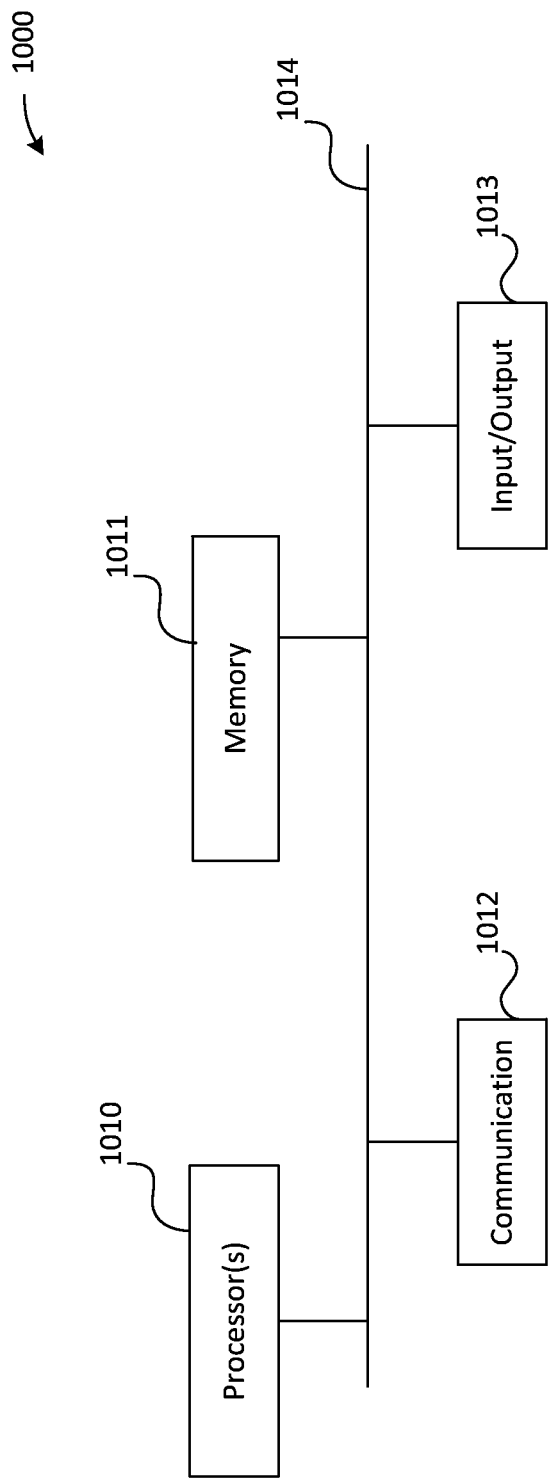
FIG. 10 is a high-level block diagram showing an example of processing system in which at least some operations related to the disclosed technique can be implemented.

FIG. 10 is a high-level block diagram showing an example of a processing device 1000 that can represent any of the devices described above, such as POS system 158, personal computing device 165, computer system 170, or any of the mobile devices described above. Any of these systems may include two or more processing devices such as represented in FIG. 10, which may be coupled to each other via a network or multiple networks. A network can be referred to as a communication network.

In the illustrated embodiment, the processing system 1000 includes one or more processors 1010, memory 1011, a communication device 1012, and one or more input/output (I/O) devices 1013, all coupled to each other through an interconnect 1014. The interconnect 1014 may be or include one or more conductive traces, buses, point-to-point connections, controllers, adapters and/or other conventional connection devices. Each processor 1010 may be or include, for example, one or more general-purpose programmable microprocessors or microprocessor cores, microcontrollers, application specific integrated circuits (ASICs), programmable gate arrays, or the like, or a combination of such devices. The processor(s) 1010 control the overall operation of the processing device 1000. Memory 1011 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1011 may store data and instructions that configure the processor(s) 1010 to execute operations in accordance with the techniques described above. The communication device 1012 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1013 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for linking a gift card with a credit card, the method comprising:
   receiving, at a payment service system and from a first point-of-sale (POS) system that includes a first card reader: (i) gift card information associated with the gift card, and (ii) first transaction information associated with a first financial transaction between a first merchant and a consumer, wherein:
      the gift card is associated with a gift card balance indicative of a total amount of funds available from a gift card financial account; and
      the gift card balance is increasable by a provisioning of additional funds by a gift card merchant that sells the gift card;
   performing a linking process to link the gift card with the credit card, the linking process including:
      sending, to the first POS system and by the payment service system, an association message to cause the first POS system to display a first message that inquires whether the consumer would like to associate the gift card with a payment card;
      receiving, at the payment service system, from the first POS system, and in response to the association message, credit card information that was obtained from the credit card during an interaction between the credit card and the first card reader; and
      updating a database, by the payment service system, to associate the gift card with the credit card;
   performing a first transaction process that includes:
      sending the gift card information to a financial system, by the payment service system, to cause first funds for the first financial transaction to be debited from the gift card financial account and credited to a first merchant financial account associated with the first merchant; and
      based on the first transaction information, causing the financial system to update the gift card balance; and
   performing a second transaction process that includes:
      receiving at the payment service system, from a second POS system, the credit card information and second transaction information that is associated with a second financial transaction between a second merchant and the consumer, the credit card information having been obtained from the credit card by a second card reader associated with the second POS system;
      based on the credit card information, accessing the database, by the payment service system, to determine that the credit card is associated with the gift card;
      in response to determining that the credit card is associated with the gift card, sending a second message, by the payment service system, to a mobile device of the consumer to cause the mobile device to display a selection interface that enables the consumer to indicate to obtain second funds for the second financial transaction based on the gift card or based on the credit card;
      receiving, by the payment service system, a third message from the mobile device that indicates to obtain the second funds based on the gift card;
      determining to use the gift card financial account, by the payment service system, for the second financial transaction; and
      sending the gift card information to the financial system, by the payment service system, to cause the second funds to be debited from the gift card financial account and credited to a second merchant financial account associated with the second merchant.

2. The method of claim 1, wherein the second funds are less than a first amount of the second transaction due to the gift card balance being less than the first amount of the second transaction, the method further comprising:
   determining a second amount, by the payment service system, that corresponds to a remaining balance of the first amount of the second transaction; and
   sending the credit card information to the financial system, by the payment service system, to cause third funds corresponding to the second amount to be debited from a credit card financial account associated with the credit card and credited to the second merchant financial account.

3. The method of claim 1, wherein the second funds are less than a first amount of the second transaction due to the gift card balance being less than the first amount of the second transaction, the method further comprising:
   determining a second amount, by the payment service system, that corresponds to a remaining balance of the first amount of the second transaction;
   based on the credit card information, accessing the database, by the payment service system, to determine whether the credit card is associated with a second gift card;
   determining that the credit card, by the payment service system, is associated with the second gift card; and
   sending second gift card information to the financial system, by the payment service system, to cause third funds corresponding to the remaining balance to be debited from a second gift card financial account associated with the second gift card, and credited to the second merchant financial account.

4. The method of claim 1, wherein updating the gift card balance includes debiting a previous gift card balance by a first amount, the first amount being equal to a second amount of the first financial transaction plus a third amount of a transaction fee associated with the first financial transaction.

5. A method comprising:
receiving, at a payment service system, monetary value card data obtained from a monetary value card interaction with a card reader of a point of sale (POS) system in association with a first financial transaction involving a payer, wherein the monetary value card is associated with a monetary value card balance indicative of a total amount of funds available from a monetary value card financial account;
in response to receiving the monetary value card data, sending, via a communication network, a first message from the payment service system to the POS system to cause the POS system to prompt the payer to provide personal information of the payer;
receiving, via the communication network, the personal information of the payer at the payment service system;
identifying, by the payment service system, a payment card associated with the payer based on the personal information of the payer, wherein the payment card is not the monetary value card;
creating an association in a database, by the payment service system, between the monetary value card and the payment card;
in response to a second message indicative of a second financial transaction involving the payment card, sending a third message to a device operated by the payer to cause the device to display a selection interface that enables the payer to indicate a selection of a particular financial account;
identifying the particular financial account, by the payment service system, based on a fourth message received from the device, the fourth message having been sent by the device in response to the payer indicating, via the selection interface, the selection of the particular financial account;
determining that the particular financial account is the monetary value card financial account;
causing, by the payment service system, funds for payment of at least a portion of an amount of the second financial transaction to be obtained based on the monetary value card financial account associated with the monetary value card by:
accessing the database, based on information obtained from the payment card by a card reader in association with the second financial transaction, to obtain account information for the monetary value card financial account, and
sending a fifth message to cause the funds for the payment of at least the portion of the amount of the second financial transaction to be obtained based on the monetary value card financial account.

6. The method of claim 5, further comprising:
sending a sixth message to the device to cause the device to prompt the payer to indicate a request to associate the monetary value card and the payment card; and
receiving a seventh message that indicates the request to associate the monetary value card and the payment card, wherein the creating the association is in response to the seventh message that indicates the request.

7. The method of claim 6, wherein:
the personal information is any of an email address that is associated with the payer, a phone number that is associated with the device, or an internet protocol (IP) address of the device; and
the third message that prompts the device to display the selection interface is sent to the device based on any of the email address, the phone number, or the IP address.

8. The method of claim 5, wherein the payer inputs the personal information via the POS system.

9. The method of claim 5, further comprising:
determining that the monetary value card balance is less than the amount of the second financial transaction;
determining a second amount that corresponds to a remaining balance for the second financial transaction after the funds for payment of at least the portion of the amount of the second financial transaction are obtained; and
causing additional funds that correspond to the remaining balance to be obtained from a payment card financial account associated with the payment card.

10. The method of claim 9, wherein the second message indicative of the second financial transaction is from a second POS system, the method further comprising:
sending a sixth message to the device, based on determining that the monetary value card balance is less than the amount of the second financial transaction, to cause the device to prompt the payer to authorize causing the additional funds to be obtained from the payment card financial account.

11. The method of claim 9, further comprising:
sending a sixth message to the device, based on determining that the monetary value card balance is less than the amount of the second financial transaction, to cause the device to prompt the payer to authorize causing the additional funds to be obtained from the payment card financial account.

12. The method of claim 5, wherein the payment card is one of a credit card, a charge card, a debit card, or an automated teller machine (ATM) card.

13. A method comprising:
receiving, at a payment service system, monetary value card data obtained by a card reader from a monetary value card in association with a first financial transaction involving a consumer and a merchant, wherein:
the monetary value card is associated with a monetary value card balance indicative of a first amount of a financial transaction that can be completed based on funds available from a monetary value card financial account; and
the monetary value card balance is increasable by a provisioning of new funds by a gift card merchant that sells the monetary value card;
sending, via a communication network, a first message from the payment service system to a point-of-sale (POS) system of the merchant, to cause the POS system to prompt the consumer to provide personal information of the consumer;
receiving the personal information of the consumer at the payment service system;
identifying, by the payment service system, a payment card associated with the consumer based on the personal information of the consumer, wherein the payment card is not the monetary value card;

creating an association, by the payment service system, between the monetary value card and the payment card in a database, based on the personal information of the consumer;

in response to a second message indicative of a second financial transaction involving the payment card, sending a third message to a device operated by the consumer to prompt the device to display a selection interface that enables the consumer to indicate a selection of a particular financial account;

determining that the particular financial account is the monetary value card financial account; and updating, by the payment service system, the monetary value card balance.

14. The method of claim 13, wherein updating the monetary value card balance includes debiting the monetary value card balance by a second amount that corresponds to a third amount corresponding to a cost of the second financial transaction.

15. The method of claim 13, wherein a merchant financial account of the merchant includes both funds held in trust for others and funds of the merchant, and wherein the first amount of the financial transaction that can be completed based on the monetary value card corresponds to a portion of the funds held in trust for others the method further comprising:

sending a third message that indicates a second amount of the second financial transaction to a computer system to enable the merchant to update, based on the second amount of the second financial transaction, a first balance that indicates the funds held in trust for others, and a second balance that indicates the funds of the merchant, wherein the computer system is associated with the merchant.

16. The method of claim 13, further comprising:

receiving, from the POS system, first transaction information associated with the first financial transaction; and based on the first transaction information, updating the monetary value card balance.

17. The method of claim 13, further comprising:

prior to updating the monetary value card balance, determining an updated monetary value card balance;

determining that the updated monetary value card balance is less than a second amount of the second financial transaction;

determining, after determining the updated monetary value card balance, a third amount that corresponds to a remaining balance of the second financial transaction; and sending payment card information associated with the payment card to a financial system to cause funds corresponding to the remaining balance to be debited from a second financial account associated with the payment card and credited to a merchant financial account associated with the merchant.

18. The method of claim 13, further comprising:

receiving an amount of funds in association with a purchase of the monetary value card from the gift card merchant; and updating the monetary value card balance based on the amount of funds.

19. A payment service system comprising:

a processor;

a communication interface, coupled to the processor, through which to communicate over a network with remote devices; and a memory coupled to the processor, the memory storing instructions which when executed by the processor cause the payment service system to perform operations including:

receiving, via the communication interface and in association with a first financial transaction involving a payer and a payee, monetary value card data obtained from a monetary value card by a card reader of a point of sale (POS) system, wherein:

the monetary value card is associated with a monetary value card balance indicative of a total amount of funds available from a monetary value card financial account; and the monetary value card was not issued in a name of any person or entity;

sending, via a communication network, a first message to the POS system, to cause the POS system to prompt the payer to provide personal information of the payer;

receiving the personal information of the payer;

identifying a payment card associated with the payer based on the personal information of the payer, wherein the payment card is not the monetary value card;

creating an association between the monetary value card and the payment card in a database, based on the personal information of the payer;

in response to a second message indicative of a second financial transaction involving the payment card, sending a third message to a device operated by the payer to prompt the device to display a selection interface that enables the payer to indicate a selection;

determining that the selection indicates the monetary value card; and causing funds for the second financial transaction to be obtained based on the monetary value card.

20. The payment service system of claim 19, wherein causing the funds for the second financial transaction to be obtained includes sending monetary value card information obtained from the monetary value card to a financial system to cause the funds associated with the second financial transaction to be debited from the monetary value card financial account and credited to a second financial account associated with the payee.

* * * * *